(12) United States Patent
Nelson

(10) Patent No.: US 8,115,174 B2
(45) Date of Patent: Feb. 14, 2012

(54) EDGE-ON SAR SCINTILLATOR DEVICES AND SYSTEMS FOR ENHANCED SPECT, PET, AND COMPTON GAMMA CAMERAS

(76) Inventor: Robert Sigurd Nelson, La Mesa, CA (US)

(*) Notice: Subject to any disclaimer, the term of this patent is extended or adjusted under 35 U.S.C. 154(b) by 0 days.

(21) Appl. No.: 12/589,432

(22) Filed: Oct. 24, 2009

(65) Prior Publication Data

US 2010/0090116 A1    Apr. 15, 2010

Related U.S. Application Data

(62) Division of application No. 11/910,440, filed on Sep. 11, 2008, now Pat. No. 7,635,848.

(51) Int. Cl.
*G01T 1/20* (2006.01)
(52) U.S. Cl. ........... 250/367; 250/361 R; 250/362; 250/370.11; 250/370.12; 250/370.13; 250/458.1; 250/459.1
(58) Field of Classification Search ......... 250/361 R, 250/362, 367, 370.11, 370.12, 370.13, 458.1, 250/459.1
See application file for complete search history.

(56) References Cited

U.S. PATENT DOCUMENTS

| | | | | |
|---|---|---|---|---|
| 4,843,245 | A * | 6/1989 | Lecomte | 250/367 |
| 6,087,663 | A * | 7/2000 | Moisan et al. | 250/367 |
| 2003/0209672 | A1 * | 11/2003 | Nelson et al. | 250/394 |

* cited by examiner

*Primary Examiner* — David Porta
*Assistant Examiner* — Hugh H Maupin

(57) ABSTRACT

The invention provides methods and apparatus for detecting radiation including x-ray, gamma ray, and particle radiation for nuclear medicine, radiographic imaging, material composition analysis, high energy physics, container inspection, mine detection and astronomy. The invention provides detection systems employing one or more detector modules comprising edge-on scintillator detectors with sub-aperture resolution (SAR) capability employed, e.g., in nuclear medicine, such as radiation therapy portal imaging, nuclear remediation, mine detection, container inspection, and high energy physics and astronomy. The invention also provides edge-on imaging probe detectors for use in nuclear medicine, such as radiation therapy portal imaging, or for use in nuclear remediation, mine detection, container inspection, and high energy physics and astronomy.

5 Claims, 13 Drawing Sheets

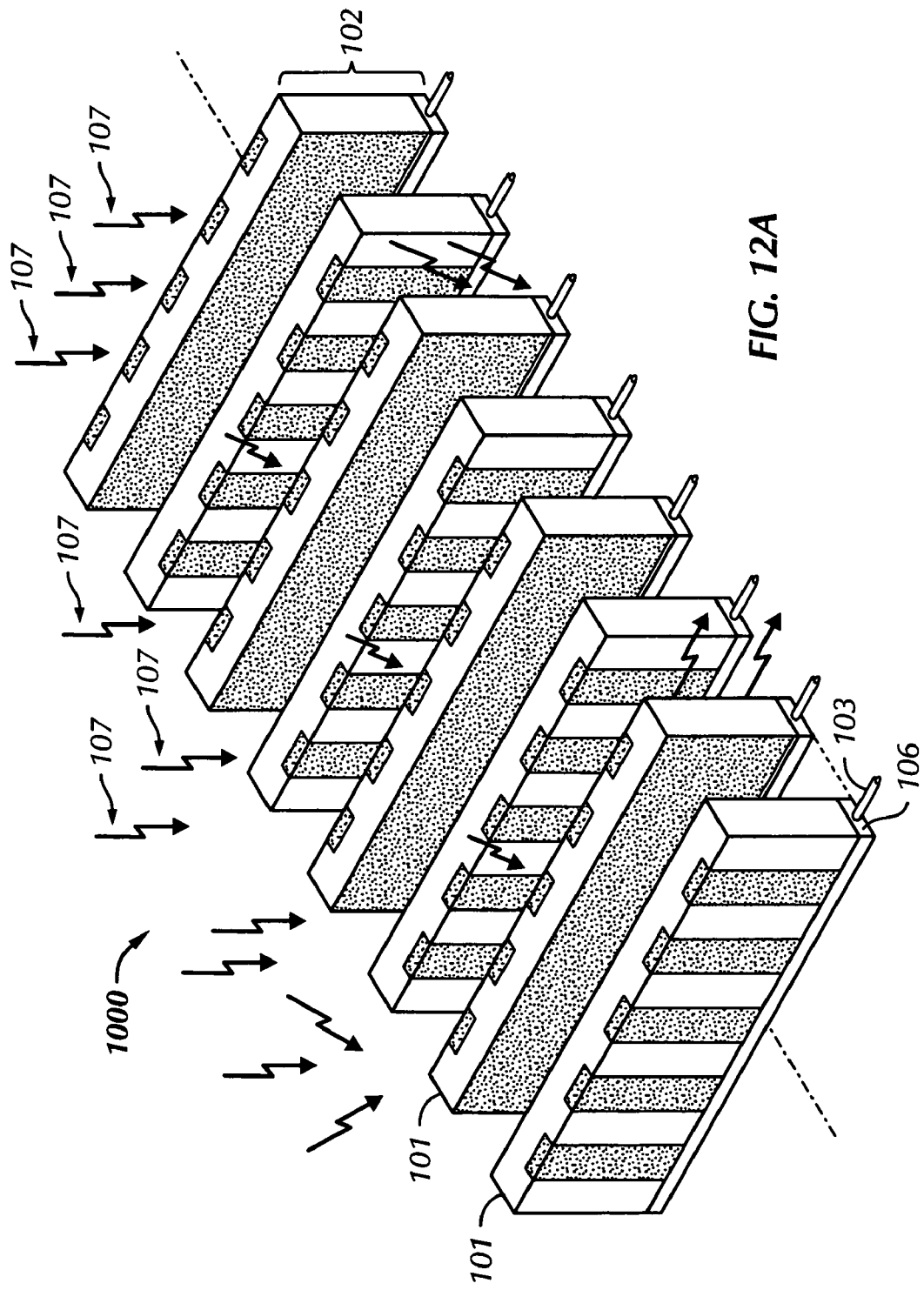

EDGE-ON SAR SCINTILLATOR DEVICES AND SYSTEMS FOR ENHANCED SPECT, PET, AND COMPTON GAMMA CAMERAS

FIELD OF THE INVENTION

This invention provides novel edge-on sub-aperture resolution (SAR) scintillator detectors, designs and systems for, e.g., enhanced single photon emission computed tomography (SPECT) and positron emission tomography (PET), and Compton gamma cameras employed in nuclear medicine, such as radiation therapy portal imaging, and for nuclear remediation, mine detection, container inspection, and high energy physics and astronomy. The invention also provides edge-on imaging probe detectors for use in nuclear medicine, such as radiation therapy portal imaging, or for use in nuclear remediation, mine detection, container inspection, and high energy physics and astronomy.

BACKGROUND OF THE INVENTION

Two important imaging modalities in nuclear medicine are single photon emission computed tomography (SPECT) and positron emission tomography (PET) in which a fraction of the photons emitted directly or indirectly (through positron annihilation) by a radionuclide distribution within a patient are detected. Typical nuclear medicine studies include but are not limited to whole body, heart, brain, thyroid, gastro-intestinal, and breast (scintimammography and positron emission mammography or PEM) imaging.

Image data acquisition in nuclear medicine presents several challenges in addition to constraints imposed by finite acquisition times and patient exposure restrictions. Most photon energies that are of interest in nuclear medicine are higher than the typical photon energies employed in diagnostic x-ray radiography. In particular, PET involves the detection of pairs of very high energy photons (511 keV) due to annihilation events.

The direction vectors and energies of non-scattered photons that escape the body are assumed to be well-defined. Unfortunately, the emission of photons from the radionuclide source distribution is non-directional and the radiation source distribution itself is typically not well-defined. Scattered photons that escape the body may have their energies and/or direction vectors altered. It is desirable for many applications to discriminate against scatter radiation reaching the detector based on energy and/or direction. A Compton-scattered photon suffers an energy loss and change in direction vector whereas a coherent or Rayleigh scattered photon only has its direction vector altered. It may be desirable to only detect radiation with a limited range of direction vectors.

Imaging systems typically offer poor directional discrimination capability and have finite response times within which to detect events (thereby limiting detection rates). Thus detection systems used in nuclear medicine such as gamma (SPECT) cameras (and sometimes PET cameras) employ focused or unfocused collimators, to help define the direction vectors of detected photons. Compton gamma cameras (based on the detection of one or more Compton scattered photons) and most PET cameras rely on electronic collimation. (The Compton camera design uses one or more relatively thin, planar semiconductor (often Si or Ge) arrays as Compton scatterers. One implementation uses a scintillator gamma camera to detect the Compton-scattered photons. Compton gamma cameras are still being refined.)

The detection format for conventional SPECT, PET, and Compton gamma cameras is "face-on" wherein the radiation entrance surface and readout surface are parallel. The majority of clinical SPECT and PET cameras employ scintillator rather than semiconductor detectors. Although semiconductor detectors may offer superior spatial and energy resolution, scintillators are typically less expensive to grow and process, they are highly reliable, they may offer superior stopping power, and they may offer faster response times (desirable for PET and time-of-flight (TOF) PET). Scintillators are employed based on conversion efficiency (that may be energy-dependent or non-proportional), emission spectrum, decay time and after glow, index of refraction (IOR), density, material-dependent photon cross sections, the presence of natural or induced radioactivity, and manufacturing cost.

Two common detector geometries used in nuclear medicine imaging are the planar detector (SPECT and PET) and the ring detector (PET). A basic gamma camera design employs a large, planar array of scintillation crystals or a single, large, planar scintillation crystal optically coupled to an array of photomultiplier tubes (PMTs). A conventional focused or unfocused collimator is typically mounted to the face of the gamma camera. This imaging system is then positioned such that the region of interest containing the source distribution is within the field of view. It provides a limited degree of spatial resolution and energy resolution while removing some fraction of scattered radiation that would otherwise degrade image quality. Unfortunately a substantial fraction of useful unscattered radiation is also attenuated. (An infrequently used design replaces the conventional collimator with a coded aperture such as a uniformly redundant array aperture that is also based on photon attenuation.) Clinical SPECT systems may use one, two, or three gamma camera detector units.

An alternative (face-on) gamma camera design eliminates the use of scintillator crystals and PMTs with a planar, modular 2-D CdZnTe semiconductor detector manufactured by butting small, 2-D (pixellated) CdZnTe arrays. Drawbacks to employing 2-D CdZnTe arrays capable of high detection efficiency include the difficulty of growing thick CdZnTe crystals with acceptable levels of defects and creating low noise, 2-D array readout structures on CdZnTe crystals.

A limitation of the face-on detection format for SPECT and PET imaging is that properties such as the detection efficiency, spatial resolution, and energy resolution exhibit a noticeable energy dependence. Basic edge-on semiconductor and scintillator detector array designs are being used as alternatives to face-on detectors for x-ray and gamma ray radiography (digital mammography and high energy industrial imaging) and gamma ray imaging in nuclear medicine (PET). Basic edge-on array detector designs are suitable for SPECT and Compton scatter imaging as well as PET imaging.

Cost-effective implementations of edge-on detector modules are needed for clinical nuclear medicine imaging systems. Factors to consider include the material properties and costs, the active detector area and volume, the desired spatial, energy, and temporal resolution, and the readout requirements. Consider an edge-on detector module comprised of one or more basic edge-on semiconductor or scintillator planar detectors (for example, a linear array of scintillator rods coupled to a photodiode strip array). The spatial resolution of a basic edge-on planar detector along the dimension of the aperture is defined by the thickness of the edge unless a collimator is used to restrict the incident radiation along that dimension. Increased spatial resolution requires the use of thinner planar detectors. The number of detector planes (and readout elements) doubles each time the aperture height is halved (the aperture resolution doubles). This forces an increase in the packing density of electronics that resides near the array of basic edge-on detectors. As the number of basic edge-on detectors per detector module increases so does the inactive volume (dead space) due to the thickness of the photodetector readout (for edge-on scintillator detectors) and any gaps between the basic edge-on detectors. The problem of dead space between basic edge-on detector planes is more severe for basic edge-on scintillator array detectors than for basic edge-on semiconductor array detectors. For example, deploying a basic edge-on scintillator detector design for a high resolution PET detector requires a very large number of very thin photodetectors such as Geiger-mode silicon photomultiplier (SiPM) arrays, internal discrete amplification photodetector arrays, avalanche photodiode (APD) linear arrays or position-sensitive APDs (PSAPDs) optically coupled to 1-D arrays of LSO scintillator rods with a 1 mm aperture height; see, e.g., Levin (2004) Nuc. Instr. Meth. Phys. Res. A 527:35-40; Levin (2004) IEEE Trans. Nucl. Sci. Vol. 51, No. 3, pp. 805-810, June 2004.

Although these readout detectors are expected to have a thickness less than 0.5 mm this thickness (dead space) is non-negligible compared to the 1 mm aperture height (and it is still significant even for a 3 mm aperture height) of the LSO scintillator array. This dead space degrades the spatial resolution in one dimension as well as the detection efficiency. The impact of this dead space could be mitigated if the scintillator rod aperture height was much larger. (A significant increase in aperture height would ease the requirements on the thickness (and cost) of the readout detector. The readout detector thickness would only need to be sufficiently thin so that the impact of dead spaces or "gaps" between basic edge-on scintillator detectors or edge-on scintillator detector modules on spatial resolution and detection efficiency is acceptable for the imaging task. Commercial, face-on modular gamma cameras have gaps between the butted detector modules.) Another application that benefits from a thin photodetector readout detector is a face-on, wearable PET detector for small animal brain imaging that uses wafer-thin APD arrays, Vaska P, et al., IEEE Trans. Nucl. Sci. Vol. 51, No. 5, pp. 2718-2722, October 2004.

The number of basic edge-on scintillator or semiconductor detector planes required to assemble an edge-on detector module can be reduced by implementing the techniques developed for measuring the "depth of interaction" (DOI) within face-on scintillator and semiconductor detectors. The benefits of this approach can be illustrated by considering a scenario in which radiation is incident face-on upon the anode or cathode side of a planar semiconductor detector of known depth or thickness (height). The DOI spatial resolution can be determined by measuring either the transit times of electrons and holes to anodes and cathodes, respectively, or the ratio of anode and cathode signals. The semiconductor detector DOI accuracy is affected by parameters such as the detector depth, electron and hole mobility, signal diffusion, and the number of defects (such as traps) in the bulk semiconductor material. (The specific parameters that affect scintillator detector DOI accuracy vary with the DOI measurement technique.) Orient the planar semiconductor detector edge-on to the source of incident radiation. The planar semiconductor detector thickness now defines the maximum height of the edge-on semiconductor detector entrance aperture. The electronically-measured face-on detector DOI positional information now defines the edge-on detector sub-aperture resolution (SAR). The interaction position along the height of the edge-on detector aperture is referred to as the interaction height.

SUMMARY OF THE INVENTION

The invention provides edge-on SAR scintillator detector designs and systems for enhanced SPECT, PET, and Compton gamma cameras, which can be employed in any appropriate system, e.g., for medical diagnosis. In one aspect, the invention provides edge-on SAR scintillator detector designs and systems for enhanced SPECT, PET, and Compton gamma cameras employed in nuclear medicine. In one aspect, the devices of the present invention are implementations of edge-on scintillator elements (rods, blocks) coupled to photodetector readout arrays with SAR capability that are suitable for constructing edge-on SAR scintillator detector modules for use in enhanced edge-on SPECT, PET, and Compton gamma cameras, as well as hand-held SPECT and PET cameras, e.g., for use in nuclear medicine. Additional applications include (photon, particle) radiation therapy portal imaging, nuclear remediation, mine detection, container inspection, and high energy physics and astronomy (x-rays, gamma rays, particles).

This invention provides edge-on SAR scintillator rod detector module wherein at least one encoding technique is employed comprising modifying a rod surface, introducing internal structures into a rod, structured light sharing between rods, and employing rods or rod segments with different pulse properties. In one aspect, a rod surface is modified by employing at least one surface treatment from: surface roughness, surface cuts, reflectors, absorbers, WLS materials, IOR differences, IOR gradients, and/or coupling structures. In one aspect, a rod interior is modified by employing at least one of: segments, sub-rods, continuous boreholes, partial boreholes. In one aspect, rod structured light sharing is implemented by employing at least one of: shared windows, offset rod segments.

In one aspect, rod pulse properties comprise at least one of: pulse shape, color spectrum. In one aspect, the surface of a rod segment is modified using surface treatment techniques. In one aspect, the boreholes comprise physical and virtual boreholes. In one aspect, physical borehole modifications comprise at least one of shape, surface treatment, and internal structure. In one aspect, aligned boreholes in adjacent layers are connected and provide SAR information. In one aspect, sub-rods are modified using at least one of surface treatment techniques, internal structure techniques, structured light sharing techniques. In one aspect, the rod shared window technique defines a cell. In one aspect, the rod shared window technique employs asymmetric 1-D windows.

In one aspect, the rod shared window technique employs alternating layers of cross-coupled optical fibers and rods. In one aspect, the rod shared window technique employs alternating layers of cross-coupled cells. In one aspect, the rod shared window technique employs alternating layers of cross-coupled fibers and rods. In one aspect, rod segments are offset either within a single layer or within a single layer and between adjacent layers. In one aspect, offset rod segments use different materials. In one aspect, the offset rod segments are modified using at least one of surface treatment techniques, internal structure techniques, and structured light sharing techniques. In one aspect, multiple materials are layered.

The invention provides a multi-material edge-on SAR scintillator detector module of the invention wherein multiple materials are deployed within the same layer. In one aspect, either a one-side readout or a multiple-side readout is employed.

The invention provides edge-on SAR scintillator block detector modules wherein at least one encoding technique is employed comprising modifying a block surface, introducing internal structures into a block, structured light sharing between blocks, and employing blocks with different pulse properties. In one aspect, the surface is modified by employing at least one surface treatment from: surface roughness, surface cuts, reflectors, absorbers, WLS materials, IOR differences, IOR gradients. In one aspect, the scintillator block is a narrow, 2-D SAR scintillator sheet. In one aspect, the interior is modified by employing at least one of: sub-sheets, continuous boreholes, and partial boreholes. In one aspect, structured light sharing is implemented by employing shared windows. In one aspect, pulse properties include at least one of: pulse shape, color spectrum. In one aspect, boreholes include physical and virtual boreholes. In one aspect, physical borehole modifications include at least one of shape, surface treatment, and internal structure. In one aspect, sub-sheets are modified using at least one of surface treatment techniques, internal structure techniques, structured light sharing techniques. In one aspect, either a one-side readout or a multiple-side readout is employed. In one aspect, aligned boreholes in adjacent layers are connected and provide SAR information. In one aspect, a modular, edge-on scintillator ring detector is used. In one aspect, either axial-on SAR scintillator detector modules or basic edge-on scintillator detector modules are employed. In one aspect, scintillator rod ends have either a uniform rectangular geometry or an annular geometry cross-section. In one aspect, scintillator block ends have either a uniform rectangular geometry or an annular geometry cross-section. In one aspect, axial edge-on SAR scintillator detector modules are employed. In one aspect, the scintillator rods are assembled in a uniform rectangular geometry or a wedge geometry. In one aspect, the scintillator blocks are assembled in a uniform rectangular geometry or a wedge geometry.

The invention provides segmented readout photodetectors for edge-on and face-on scintillator detector modules. In one aspect, photodetector comprises one of: a strip array PSAPD detector, a sub-strip array PSAPD detector, a sub-area array PSAPD detector, a mixed PSAPD detector, and/or a sub-strip SDD detector. These readout geometries can be implemented using SiPM arrays or internal discrete amplification photodetector arrays. These segmented readout photodetectors can be incorporated into, or used with, any edge-on scintillator detector module device of the invention.

In accordance with the present invention, an edge-on scintillator detector module with SAR capability is provided as a radiation detection device for nuclear medicine (SPECT, PET, Compton camera) imaging. Specific implementations can be used for SPECT-PET imaging and hand-held SPECT or PET camera imaging, including probes. The edge-on SAR scintillator detector module can be used to detect both particle and photon radiation, making it suitable for other applications such as radiation therapy portal imaging, nuclear remediation, mine detection, container inspection, and high energy physics and astronomy. Two main implementations of the edge-on SAR scintillator detector module use either scintillator rods or scintillator blocks. Two categories of scintillator blocks include 3-D and 2-D (sheet) blocks. Trade-offs exist in terms of cost of implementation, spatial and energy resolution, response uniformity, dead detector volume, and detector dead time. Scintillator rods and blocks can both be incorporated into an edge-on SAR scintillator detector module. A number of external (surface) and internal optimization techniques (encoding methods) are described that can result in improved SAR resolution. Multiple scintillator materials as well as non-scintillator materials can be incorporated into an edge-on SAR scintillator detector module. A variety of photodetector readout systems can be coupled to an edge-on SAR scintillator detector module. Two exemplary readout formats are one-side and multi-side (typically two-side) readout. Exemplary photodetector geometries include 2-D arrays, 1-D strip arrays, and position-sensitive area detectors. Modifications to these photodetector geometries may reduce photodetector readout noise as well as edge-on SAR scintillator detector dead time. Thin photodetector devices can be used to minimize the dead space between detector modules.

The invention provides products of manufacture, or apparatus, for detecting radiation comprising: an edge-on sub-aperture resolution (SAR) scintillator rod detector module of the invention; a multi-material edge-on SAR scintillator detector of the invention; an edge-on SAR scintillator block detector module of the invention; an axial-on SAR scintillator detector module of the invention; or a segmented readout photodetector for edge-on and face-on scintillator detector modules of the invention; or any combination thereof. In one aspect, the products of manufacture, or apparatus, are used to detect radiation, for example, the detected radiation can be x-ray, beta radiation, gamma ray, and/or particle radiation. In one aspect, the products of manufacture, or apparatus, comprise a SPECT device, a PET device, a Compton probe detector or a Compton camera, or a combination thereof. In one aspect, the products of manufacture, or apparatus, can be hand-held devices.

The invention provides container inspection device for detecting radiation comprising: an edge-on sub-aperture resolution (SAR) scintillator rod detector module of the invention; a multi-material edge-on SAR scintillator detector of the invention; an edge-on SAR scintillator block detector module of the invention; an axial-on SAR scintillator detector module of the invention; or a segmented readout photodetector for edge-on and face-on scintillator detector modules of the invention; or any combination thereof. In one aspect, the products of manufacture, or apparatus, are used to detect radiation, for example, the detected radiation can be x-ray, beta radiation, gamma ray, and/or particle radiation. In one aspect, the container inspection device further comprises, is part of, or is operably linked to a SPECT device, a PET device, a Compton probe detector, a Compton camera, or a combination thereof. In one aspect, the container inspection device is a hand-held device.

The invention provides products of manufacture, or apparatus, including, e.g., edge-on sub-aperture resolution (SAR) scintillator rod detector modules, comprising a two-side readout using perpendicular strip photodetectors as set forth in FIG. 1. The invention provides products of manufacture, or apparatus, including, e.g., edge-on sub-aperture resolution (SAR) scintillator rod detector modules, comprising an edge-on scintillator rod with an internal structure consisting of multiple segments as set forth in FIG. 2c. The invention provides products of manufacture, or apparatus, including, e.g., edge-on sub-aperture resolution (SAR) scintillator rod detector modules, comprising an edge-on scintillator rod with an internal structure consisting of a single modified segment with a surface treatment comprised of a reflective grid pattern as set forth in FIG. 2d. The invention provides products of manufacture, or apparatus, including, e.g., edge-on sub-aperture resolution (SAR) scintillator rod detector modules, comprising an edge-on scintillator rod with an internal structure consisting of a single modified segment with a surface treatment comprised of a focused pattern of shallow surface cuts as set forth in FIG. 2e. The invention provides products of manufacture, or apparatus, including, e.g., edge-on sub-aperture resolution (SAR) scintillator rod detector modules, comprising an edge-on scintillator rod with an internal structure consisting of an array of boreholes as set forth in FIG. 2f. The invention provides products of manufacture, or apparatus, including, e.g., edge-on sub-aperture resolution (SAR) scintillator rod detector modules, comprising an edge-on scintillator rod with an internal structure consisting of 1-D and 2-D sub-rods as set forth in FIG. 2g.

The invention provides products of manufacture, or apparatus, including, e.g., edge-on sub-aperture resolution (SAR) scintillator rod detector modules, comprising a 2-rod cell wherein a 1-D shared window (a 1-D window pattern) couples a scintillator rod to one adjacent scintillator rod as set forth in FIG. 3a. The invention provides products of manufacture, or apparatus, including, e.g., edge-on sub-aperture resolution (SAR) scintillator rod detector modules, comprising a 4-rod cell wherein a scintillator rod with a 2-D shared window (lower right corner) is coupled to two adjacent scintillator rods as set forth in FIG. 3b, and optionally the 2-D shared window comprising two asymmetric 1-D window patterns.

The invention provides products of manufacture, or apparatus, including, e.g., edge-on sub-aperture resolution (SAR) scintillator rod detector modules, comprising a shared window defined by cross-coupling two edge-on scintillator rod arrays as set forth in FIG. 4a. The invention provides products of manufacture, or apparatus, including, e.g., edge-on sub-aperture resolution (SAR) scintillator rod detector modules, comprising a shared window defined by cross-coupling two edge-on scintillator rod arrays as set forth in FIG. 4b.

The invention provides products of manufacture, or apparatus, including, e.g., edge-on sub-aperture resolution (SAR) scintillator rod detector modules, comprising a single layer of offset edge-on scintillator rod segments as set forth in FIG. 5a. The invention provides products of manufacture, or apparatus, including, e.g., edge-on sub-aperture resolution (SAR) scintillator rod detector modules, comprising a 2-layer cell of offset edge-on scintillator rod segments in which segments are offset within a layer and between layers as set forth in FIG. 5b.

The invention provides products of manufacture, or apparatus, including, e.g., edge-on sub-aperture resolution (SAR) scintillator rod detector modules, comprising a stack of edge-on scintillator blocks comprising scintillator materials with single-side readouts as set forth in FIG. 6.

The invention provides products of manufacture, or apparatus, including, e.g., edge-on sub-aperture resolution (SAR) scintillator rod detector modules, comprising horizontal and vertical stacks of edge-on scintillator sheets as set forth in FIG. 7.

The invention provides products of manufacture, or apparatus, including, e.g., edge-on sub-aperture resolution (SAR) scintillator rod detector modules, comprising horizontal edge-on scintillator sheets with an internal structure comprising an array of boreholes as set forth in FIG. 8.

The invention provides products of manufacture, or apparatus, including, e.g., edge-on sub-aperture resolution (SAR) scintillator rod detector modules, comprising a horizontal stack of edge-on scintillator sheets with an internal structure comprising an array of coupled boreholes with fiber optics as set forth in FIG. 9.

The invention provides products of manufacture, or apparatus, including, e.g., edge-on sub-aperture resolution (SAR) scintillator rod detector modules, comprising a strip array PSAPD wherein each strip is provided with dual readout electrodes (a SA-PSAPD) as set forth in FIG. 10a. The invention provides products of manufacture, or apparatus, including, e.g., edge-on sub-aperture resolution (SAR) scintillator rod detector modules, comprising a strip array PSAPD wherein each strip is divided into multiple sub-strips and each sub-strip is provided with dual readout electrodes (a SSA-PSAPD) as set forth in FIG. 10b.

The invention provides products of manufacture, or apparatus, including, e.g., edge-on sub-aperture resolution (SAR) scintillator rod detector modules, comprising an axial edge-on SAR scintillator ring PET detector configuration with a uniform rectangular geometry as set forth in FIG. 11a. The invention provides products of manufacture, or apparatus, including, e.g., edge-on sub-aperture resolution (SAR) scintillator rod detector modules, comprising axial-on SAR scintillator rods with an annular cross section that increases with radius suitable for a ring PET detector configuration as set forth in FIG. 11b. The invention provides products of manufacture, or apparatus, including, e.g., edge-on sub-aperture resolution (SAR) scintillator rod detector modules, comprising an axial edge-on SAR scintillator ring PET detector configuration with a truncated-triangle (wedge) geometry as set forth in FIG. 11c.

The invention provides products of manufacture, or apparatus, including, e.g., edge-on sub-aperture resolution (SAR) scintillator rod detector modules, edge-on sub-aperture resolution (SAR) scintillator rod detector module comprising at least any two of the structural limitations set forth herein, e.g., in FIGS. 1 to 11.

The invention provides edge-on imaging probe detectors, wherein at least one detector type is employed from: an edge-on scintillator detector and, an edge-on semiconductor detector. In one aspect, the invention provides edge-on imaging probe detectors comprising at least one detector type selected from the group consisting of an edge-on scintillator detector, an edge-on semiconductor detector and a combination thereof. The invention provides products of manufacture, or apparatus, comprising these edge-on imaging probe detectors. In one aspect, the edge-on imaging probe detectors are used in nuclear medicine, e.g., for radiation therapy portal imaging, or for use in nuclear remediation, mine detection, container inspection, and high energy physics and astronomy. The invention provides single photon emission computed tomography (SPECT) devices, positron emission tomography (PET) devices or Compton gamma cameras comprising the edge-on imaging probe detector of the invention. In one aspect, an apparatus of the invention further comprises, is operably linked to, or is part of a single photon emission computed tomography (SPECT) device, a positron emission tomography (PET) device, a Compton probe detector or a Compton gamma camera.

In one aspect, in the edge-on imaging probe detectors of the invention, the edge-on scintillator detector implements at least one of: a rod geometry, and/or a block geometry, or a combination thereof. In one aspect, the edge-on imaging probe detector has a detector geometry comprising, e.g., a basic edge-on detector, an enhanced edge-on detector or a combination thereof. In one aspect, the detector geometry comprises a mixed edge-on detector, an enhanced edge-on detector, a basic edge-on detector, a hybrid edge-on detector or a combination thereof. In one aspect, the detector geometry comprises hybrid edge-on detectors.

In one aspect, the detector generates a readout element pitch, wherein optionally the readout element pitch is variable. In one aspect, the detector generates a horizontal readout strip pitch, wherein optionally the horizontal readout strip pitch is variable. In one aspect, the detector generates a segmented readout strip pitch wherein optionally the segmented readout strip pitch is variable along a vertical direction. In one aspect, at least one of the edge-on imaging probe detectors is configured in a 4-quadrant geometry. In one aspect, at least one of the edge-on imaging probe detectors is configured in a 4-quadrant geometry and comprises an internal collimator. In one aspect, the edge-on imaging probe detector comprises a limited, basic 2-D edge-on detector.

In one aspect, the edge-on imaging probe detector of the invention further comprises, or is operably linked to, or is part of an edge-on sub-aperture resolution (SAR) scintillator rod detector, a single photon emission computed tomography (SPECT) device, a positron emission tomography (PET) device, a Compton probe detector or a Compton gamma camera. In one aspect, the SAR edge-on detector is a limited, 3-D SAR edge-on detector. In one aspect, the edge-on detector is configured as a Compton probe detector, a dual-detector probe or a combination thereof.

The invention provides a mine detection probe operably linked to the edge-on imaging probe detector of the invention, or comprising the edge-on imaging probe detector of the invention.

The invention provides a radiation detection device operably linked to the edge-on imaging probe detector of the invention, or comprising the edge-on imaging probe detector of the invention.

In one aspect of the edge-on imaging probe detector of the invention, the edge-on imaging probe detector comprises non-detector materials. In one aspect, the edge-on imaging probe detector comprises (implements) an electronic internal collimator.

The invention provides a method of providing electronic internal collimation by selectively ignoring specific patterns of detector elements either by not reading them or by reading them and not including their data during image reconstruction.

In one aspect, the invention provides novel edge-on imaging probe detector designs for medical imaging purposes, e.g., for nuclear medicine, e.g., for experimental, diagnostic or treatment purposes. In one aspect, the devices of the invention are implementations of 1-D and 2-D arrays of basic edge-on semiconductor detector elements or scintillator detector elements, which in alternative aspects lack SAR capabilities. These embodiments are referred to as "basic" edge-on imaging probe detector designs. Detector elements of the invention can take the form of strips or pixels.

In one aspect, the devices of the present invention are implementations of 2-D and 3-D arrays of SAR edge-on semiconductor detector elements or scintillator detector elements. These embodiments are referred to as "enhanced" or SAR edge-on imaging probe detector designs. In one aspect, the devices of the present invention are implementations of both basic and SAR edge-on semiconductor detector arrays or scintillator detector arrays. These are referred to as "mixed" edge-on imaging probe designs.

In one aspect, the devices of the present invention are implementations of basic and (or) SAR edge-on semiconductor detector arrays and (or) scintillator detector arrays layered with face-on semiconductor or scintillator detector arrays. These embodiments are referred to as "hybrid" edge-on imaging probe detector designs. Edge-on detector arrays can be stacked (layered) in basic, enhanced, mixed, and/or hybrid edge-on imaging probe designs. Basic and/or SAR edge-on detector can utilize multiple materials. Edge-on imaging probe designs may incorporate internal collimators, external collimators, both internal and/or external collimators, or none at all. Edge-on imaging probe detector designs are suitable for imaging charged or neutral particles, coincident photons, and/or non-coincident photons.

The invention provides 1-D edge-on semiconductor detectors assembled as a 2-D edge-on imaging probe detector comprising an edge-on imaging probe detector of the invention. In one aspect, the 1-D edge-on semiconductor detector is configured as set forth in FIG. 12a.

The invention provides arrays of basic, 1-D edge-on semiconductor detectors assembled as a 4-quadrant edge-on imaging probe detector configured as set forth in FIG. 12b. In one aspect, these 1-D edge-on semiconductor detectors comprise at least one internal collimator. In one aspect, these 1-D edge-on semiconductor detectors comprise an edge-on imaging probe detector of the invention.

The invention provides butted pair of basic, 1-D edge-on semiconductor detectors comprising variable anode strip pitch near the radiation entrance surface for use in a 4-quadrant edge-on imaging probe detector of the invention. In one aspect, these butted pair of basic, 1-D edge-on semiconductor detectors are configured as set forth in FIG. 13a. In one aspect, these basic, 1-D edge-on semiconductor detectors comprise an edge-on imaging probe detector of the invention.

The invention provides arrays of limited, basic, 2-D edge-on semiconductor detectors with a segmented anode strip and a variable anode strip pitch along the vertical direction near the entrance surface, comprising the edge-on imaging probe detector of the invention. In one aspect, these 2-D edge-on semiconductor detectors are configured as set forth in FIG. 13b.

The invention provides arrays of limited, basic, 2-D edge-on semiconductor detectors with anode strips and crossed cathode strips with a variable cathode strip pitch near the entrance surface, comprising the edge-on imaging probe detector of the invention. In one aspect, these basic, 2-D edge-on semiconductor detectors are configured as set forth in FIG. 13b.

The invention provides enhanced 3-D edge-on imaging probe detectors comprising a SAR edge-on scintillator rod array in which the first layer of scintillator rods can be thin (a variable rod pitch along the vertical direction near the entrance surface) and of a material comprising a plastic scintillator or a low Z scintillator crystal in order to image charge particles or low energy gamma rays. In one aspect, these enhanced 3-D edge-on imaging probe detectors are configured as set forth in FIG. 14. In one aspect, these enhanced 3-D edge-on imaging probe detectors comprise the edge-on imaging probe detector of the invention.

The invention provides mixed edge-on imaging probe detectors comprising a single layer SAR scintillator rod array comprising a plastic scintillator or a low Z scintillator crystal material for imaging charge particles or a low energy gamma rays stacked on top of an array of basic, and 1-D edge-on semiconductor detectors assembled as a 4-quadrant edge-on detector with an internal collimator. In one aspect, these mixed edge-on imaging probe detectors comprise the edge-on imaging probe detector of the invention. In one aspect, these mixed edge-on imaging probe detectors are configured as set forth in FIG. 15.

The invention provides hybrid imaging probe detectors comprising a thin, 2-D, face-on silicon (Si) array detector for charge particle that is stacked on top of a 4-quadrant edge-on semiconductor detector array with an internal collimator. In one aspect, these hybrid imaging probe detectors comprise a face-on detector array comprising a plastic scintillator or a low Z phosphor material coupled to a thinned photodetector array. In one aspect, these hybrid imaging probe detectors are configured as set forth in FIG. 16. In one aspect, these hybrid imaging probe detectors comprise the edge-on imaging probe detector of the invention.

In one aspect, the invention provides edge-on sub-aperture resolution (SAR) scintillator devices, detectors, designs and systems comprising the hybrid imaging probe detectors of the invention, or the mixed edge-on imaging probe detectors of the invention, or the enhanced 3-D edge-on imaging probe detectors of the invention, or arrays of limited, basic, 2-D edge-on semiconductor detectors of the invention, or the butted pair of basic, 1-D edge-on semiconductor detectors of the invention, or the 1-D edge-on semiconductor detectors assembled as a 2-D edge-on imaging probe detector of the invention, or the 2-D and 3-D arrays of SAR edge-on semiconductor detector elements or scintillator detector elements of the invention, or a combination thereof. In alternative aspects, these detection devices can be used to detect any form of radiation for, e.g., medical purposes, or industrial, homeland security or defense purposes, e.g., to detect radiation in mines, ships, shipping containers, airplanes, packages, cars, trucks and the like. In one aspect, the detection devices, detectors, designs and/or systems are handheld devices.

The invention provides silicon drift detector (SDD), a photodiode array, a Geiger-mode silicon photomultiplier (SiPM) array, an internal discrete amplification photodetector array, an APD array or a position-sensitive APD (PSAPD) comprising the edge-on imaging probe detector of the invention.

The invention provides silicon drift detector (SDD), a photodiode array, a Geiger-mode silicon photomultiplier (SiPM) array, an internal discrete amplification photodetector array, an APD array or a position-sensitive APD (PSAPD) comprising the hybrid imaging probe detectors of the invention, or the mixed edge-on imaging probe detectors of the invention, or the enhanced 3-D edge-on imaging probe detectors of the invention, or arrays of limited, basic, 2-D edge-on semiconductor detectors of the invention, or the butted pair of basic, 1-D edge-on semiconductor detectors of the invention, or the 1-D edge-on semiconductor detectors assembled as a 2-D edge-on imaging probe detector of the invention, or the 2-D and 3-D arrays of SAR edge-on semiconductor detector elements or scintillator detector elements of the invention, or a combination thereof.

The compositions, devices, detectors, designs and systems of the invention can be used with any known device, e.g., with any known imaging device, e.g., as an integral part of the device or operatively linked to the device; for example, compositions, devices, detectors, designs and systems of the invention can be used with any known enhanced single photon emission computed tomography (SPECT) device or system, or any known positron emission tomography (PET) device or system, or any known gamma camera, e.g., a Compton gamma camera, any known X-ray imaging, any known fluoroscopy device or system, or any known computed tomography (CT) device or system, or any known digital mammography device or system, or any known magnetic resonance imaging (MRI) device or system, or any known ultrasound device or system; as described, e.g., in U.S. Pat. Nos. 7,019,297; 6,996,430; 6,992,762; 6,967,331; 6,978,039; 6,943,355; 6,921,840; 6,917,826; 6,803,580; 6,794,653; 6,774,358; 6,558,333; 6,642,523; 6,429,434; 6,289,235; 6,226,543.

These and other advantages of the present invention will become apparent upon reference to the accompanying drawings and the following description.

The details of one or more embodiments of the invention are set forth in the accompanying drawings and the description below. Other features, objects, and advantages of the invention will be apparent from the description and drawings, and from the claims.

All publications, patents, patent applications, U.S. Patent Office Disclosure Documents, cited herein are hereby expressly incorporated by reference for all purposes.

BRIEF DESCRIPTION OF THE DRAWINGS

FIG. 12a illustrates a perspective view of an array of basic, 1-D edge-on semiconductor detectors assembled as a 2-D edge-on imaging probe detector.

DETAILED DESCRIPTION

The invention provides designs for edge-on scintillator rod and block detectors with SAR capability, as well as readout devices, which are incorporated into discrete detector modules that can be used for radiation imaging directly, for small hand-held imaging devices, and/or as part of a detector module array. Edge-on SAR scintillator rod and block detectors typically implement one-side or two-side readout designs. Planar and ring detector geometries are widely used in nuclear medicine. Arrays of edge-on SAR detector modules can be assembled to form planar and ring detectors. The general properties of an edge-on detector module (comprised of edge-on scintillator and semiconductor detectors, readout and processing electronics, power management, communications, temperature control, and radiation shielding) as well as several edge-on detector module array configurations are described in Nelson, U.S. Pat. No. 6,583,420 and Nelson, U.S. Pat. Appl. publication No. 20040251419, and Nelson, U.S. Patent Office Disclosure Document No. 567471. Specific 1-D and 2-D edge-on scintillator and semiconductor detectors (including DOI capability) without SAR capabilities are described in Nelson, U.S. Pat. No. 4,560,882 and Nelson, U.S. Pat. No. 4,937,453. Efficient manufacturing techniques to build structured 1-D and 2-D scintillator arrays for gamma and x-ray detection are described in Nelson, U.S. Pat. No. 5,258,145.

In some aspects, the invention's use of edge-on detector with SAR capability can significantly lower the cost of deploying edge-on detectors in nuclear medicine imaging systems. There are a number of benefits associated with implementing SAR capabilities in edge-on detectors. The edge-on detector aperture height no longer limits the aperture spatial resolution. The total number of basic edge-on detectors and the number of readout channels (readout electronics) required to cover a desired imaging area is reduced. The sub-aperture positional information may allow meaningful corrections to the expected signal losses and thus improve energy resolution. Other benefits can include an increase in available image detector volume due to a decrease in the number of edge-on detector physical boundaries (detector material properties typically degrade near the perimeter) and the number of gaps that may be present between edge-on detector planes. Limitations may include the need for better timing resolution, additional (and faster) signal processing, and a decrease in the event count rate. Edge-on SPECT, PET, and Compton gamma cameras that utilize edge-on detectors with SAR capabilities are referred to as "enhanced" edge-on SPECT, PET, and Compton gamma cameras, respectively.

Figure 1:
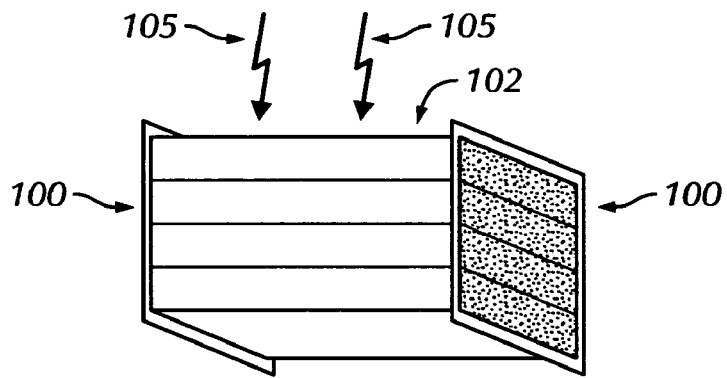
FIG. 1 illustrates a perspective view of edge-on SAR scintillator rod detector module with a two-side readout using perpendicular strip photodetectors.

Consider a specific example of a detector module that might be used for face-on, high resolution PET imaging. Suppose that a face-on detector module that consists of a 30×30 array of 1×1×10 mm$^3$ scintillator rods (approximately 10 mm of stopping power using BGO, LSO, YAP, etc. scintillator material) uses a two-side or dual readout design. The face-on detector surface resolution is 1×1 mm$^2$ (ignoring the thickness of any reflective coating or gaps that are present). Suppose that the face-on DOI resolution is approximately 1 mm FWHM. Now turn the face-on array on its side or "edge-on" (FIG. 1). The stopping power is now increased from 10 mm to 30 mm although the surface area of the detector face is now reduced from 30×30 mm$^2$ to 30×10 mm$^2$. The edge-on scintillator detector DOI resolution is now fixed by the dimension of a scintillator rod element at 1 mm (eliminating signal strength depth-dependence). The edge-on detector surface resolution is now 1 mm×the aperture resolution (which was determined electronically to be 1 mm based on the face-on DOI measurement).

A problem with face-on DOI scintillator detectors is that Compton scattering of incident radiation is biased in the forward direction such that the probability of detecting the scatter event downstream from the initial off-axis event within the same scintillator rod may not be small (resulting in an inaccurate DOI estimate). The edge-on SAR scintillator rod detector design reduces the likelihood that a Compton scatter photon will be detected in the same scintillator rod for a relatively large range of incident angles. This simplifies the tracking of most subsequent interactions or events after a primary interaction.

The edge-on SAR scintillator detector module format may reduce the cost of using certain scintillator materials as well as the readout detectors. Scintillator rods with smaller lengths may have superior manufacturing yields. Furthermore, if the required DOI resolution is 3 mm rather than 1 mm the scintillator rod dimensions can be relaxed to 1×3×10 mm³, reducing the number of rods by ⅓ and lowering manufacturing costs even more. (Note that this benefit needs to be balanced against the increased probability of a Compton event within the same rod with a lateral offset.) Providing 1 mm aperture resolution over 10 mm is now accomplished with 2 readout arrays rather than 10 readout arrays individually-coupled to a basic edge-on scintillator array with 1 mm aperture height. The total lost detector volume due to the thickness of the readout arrays is also reduced by (approximately) a factor of 5. (Note that the energy resolution of a dual readout, edge-on SAR scintillator rod design is likely to be reduced compared to a basic edge-on scintillator detector design.)

An alternative to the edge-on SAR scintillator rod design is the edge-on scintillator block (3-D block or 2-D sheet). Several factors will influence the decision to use edge-on SAR scintillator rods or blocks (or both) in detector modules. The block design could lower the cost of the scintillator elements since it typically requires fewer scintillator elements than rod designs. Certain block designs will experience an increase in signal noise due to the detection of a greater number of Compton scatter events. The use of scintillator blocks rather than rods, due to the increased scintillator volume, will increase the over-all detector module dead time per unit volume. The response uniformity of a block may worsen near or away from certain boundaries depending on its dimensions and surface modifications. Detector modules based on edge-on SAR scintillator rods (depending on the design) may offer more uniform spatial resolution and better energy resolution than detector modules based on edge-on SAR scintillator blocks but at a greater cost.

Two types of exemplary edge-on scintillator rod configurations, single rod geometries and structured light sharing rod geometries, for edge-on SAR scintillator rod detector modules will be described. A number of optimization techniques (such as the use of internal structures, surface treatments, and pulse properties (pulse shape, color)) may be applied. The choice of configuration and optimization technique(s) for a SPECT or PET edge-on SAR scintillator detector module will be the result of numerous trade-offs: desired spatial resolution and uniformity, energy resolution, pulse properties (pulse shape, spectrum), scintillator IOR, energy-dependent conversion efficiency, stopping power, the energy range, the photodetector readout, the count rate, and the imaging geometry (planar or ring, large or small volume).

Single Rod Geometries.

Figure 2A:
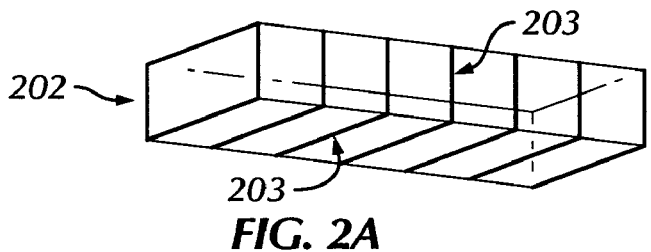
FIG. 2a illustrates a perspective view of a surface treatment comprised of absorptive black stripes distributed along the surface of an edge-on scintillator rod.
Figure 2B:
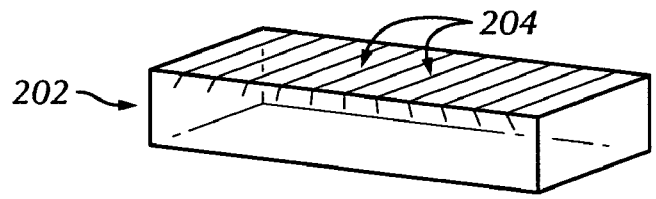
FIG. 2b illustrates a perspective view of a surface treatment comprised of angled surface cuts distributed along a surface of an edge-on scintillator rod.

Scintillator rod 202 geometries can benefit from the application of surface modification techniques (FIG. 2a-2b). Uniform and non-uniform (patterned) surface treatments include modifying absorption 203, reflection, IOR mismatches, IOR gradients, spectral properties (using wavelength shifting (WLS) materials), and scattering properties as a function of position by applying coatings, controlling surface roughness, introducing shallow surface cuts 204, and applying coupling structures such as very thin focused fiber bundle layers or SELFOC microlenses. For example, diffuse or specular reflective coatings, films (or reflective sheets) are often used to provide optical isolation between layers of scintillator rods (allowing optical communication within a layer) or between adjacent scintillator rods. A WLS material can provide additional encoded information if the readout device provides a color-sensitive response (due to the use of a color filter or the inherent spectral response of the photodetector) or the WLS effect introduces a delay that modifies the pulse distribution. IOR gradient structures (similar to the concept of SELFOC microlenses) can be created by ion implantation.

Scintillator rod geometries can benefit from the introduction of internal structures (FIG. 2c-2g) such as segmentation 205, boreholes 208, 1-D sub-rods 215, and 2-D sub-rods 216. Segment surfaces can be modified using one or more surface treatment techniques (manipulating reflection 206, absorption, IOR mismatches, IOR gradients, roughness, shallow surface cuts, WLS materials, applying coupling structures such as very thin focused fiber bundle layers or SELFOC micro-lenses to create patterns that will control how the light is transmitted, reflected, or absorbed at the segment interface. For example, a thin array of focused fiber bundle or a SELFOC microlens array could be used to enhance propagation in one direction between two adjacent segments. A pattern of angled cuts or surface etching or ion implantation could also be used to create a shallow focusing pattern 207 similar to a microlens array (FIG. 2e). Additional directionality can be achieved by introducing a reflective material in between the apertures of the focused pattern. The segment surface modifications can be varied according to location with respect to the readout interface(s) in order to control how a light signal will be distributed to the readout photodetector(s). Boreholes can be continuous or partial. Partial boreholes do not extend all the way through the scintillator rod and thus serve a role intermediate between surface treatments such as shallow surface cuts and continuous boreholes with respect to modifying light propagation. In addition a continuous or partial borehole can be physical (created by ablation, cutting, milling, or drilling) or virtual (created by modifying the scintillator material IOR or absorption properties locally using techniques such as ion implantation, laser heating, or controlled doping). A particularly simple way to introduce boreholes with simple or complex shapes into a rod is to form the boreholes at the interface surface between rod segments. Complete boreholes are formed by bringing the two segment surfaces together. The size, shape, internal coatings, and distribution of physical boreholes can be manipulated in order to control (encode) how light propagates through and around a rod. For example, surface treatments such as reflecting or WLS films can be applied to specific areas on the borehole walls. Internal structures comprised of passive materials (such as fibers, spheres, etc.) and active materials (including scintillators, photoconductive and photoemissive photodetectors, and converting materials such as single or multiple WLSs, WLS fibers, gases, etc.) can be introduced into a borehole, providing additional means of encoding (and in some cases recording) the signal. (Note that internal structures such as boreholes can be aligned across rods and connected to a readout that provides SAR information in a manner similar to block geometries (FIG. 9).) The surface treatments and internal structures such as segments and boreholes can also be applied to sub-rods.

Figure 2C:
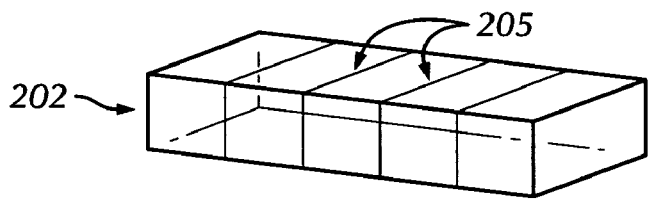
FIG. 2c illustrates a perspective view of an edge-on scintillator rod with an internal structure consisting of multiple segments.
Figure 2D:
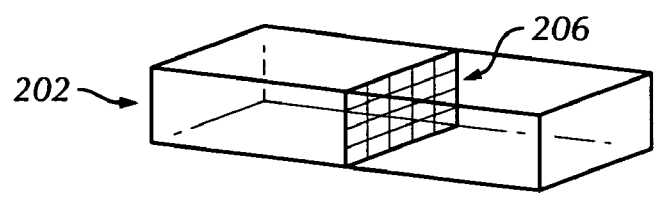
FIG. 2d illustrates a perspective view of an edge-on scintillator rod with an internal structure consisting of a single modified segment with a surface treatment comprised of a reflective grid pattern.
Figure 2E:
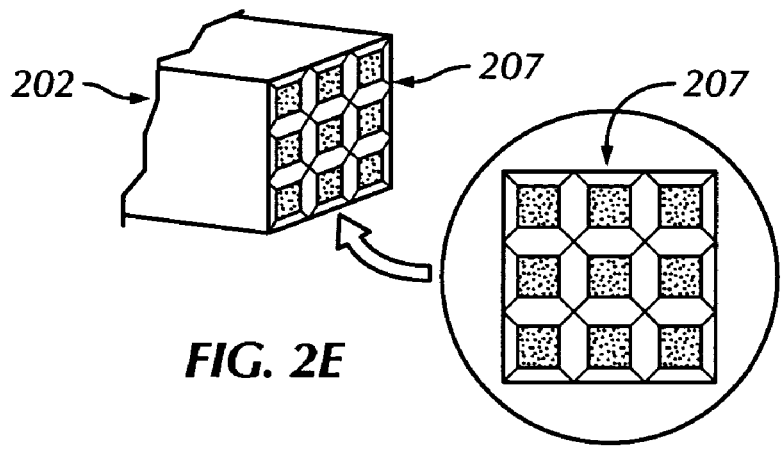
FIG. 2e illustrates a perspective view of an edge-on scintillator rod with an internal structure consisting of a single modified segment with a surface treatment comprised of a focused pattern of shallow surface cuts.
Figure 2F:
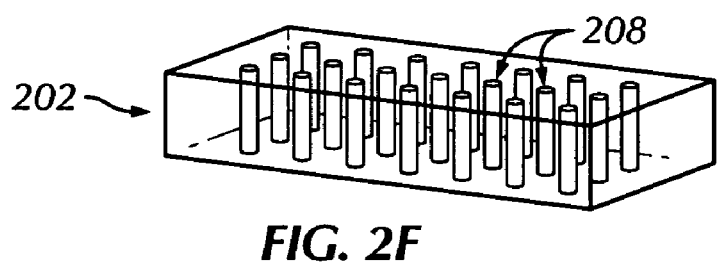
FIG. 2f illustrates a perspective view of an edge-on scintillator rod with an internal structure consisting of an array of boreholes.
Figure 2G:
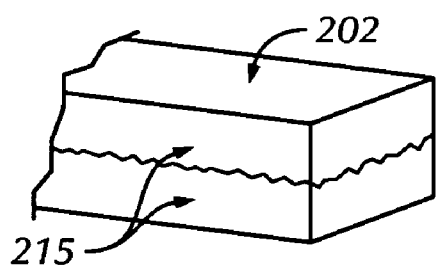
FIGS. 2g-2h illustrates perspective views of an edge-on scintillator rod with an internal structure consisting of 1-D and 2-D sub-rods.
Figure 2H:
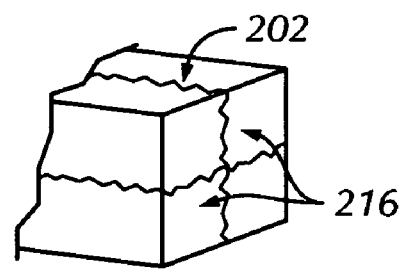

Rod (and sub-rod) geometries with a segmented internal structures can further encode the segments using different materials in order to utilize pulse property (pulse shape, color) techniques (FIG. 2c).

Structured Light Sharing Rod Geometries.

Figure 3A:
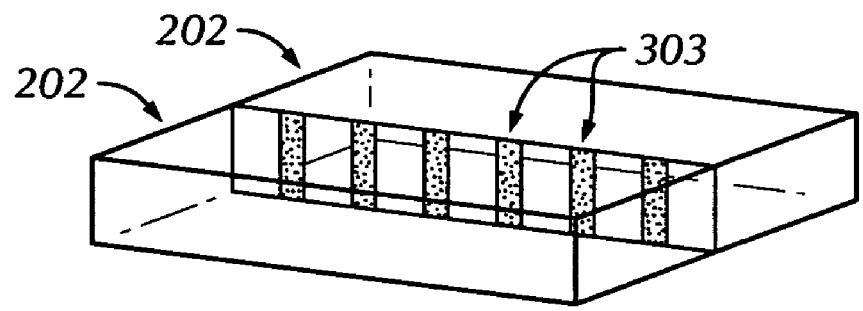
FIG. 3a illustrates a perspective view of a 2-rod cell wherein a 1-D shared window (a 1-D window pattern) couples a scintillator rod to one adjacent scintillator rod.
Figure 3B:
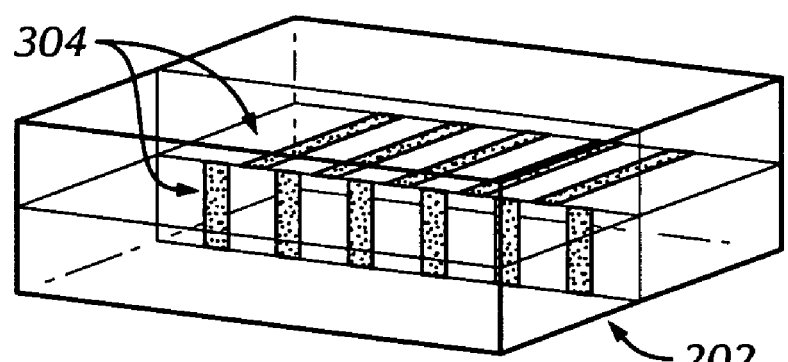
FIG. 3b illustrates a perspective view of a 4-rod cell wherein a scintillator rod with a 2-D shared window (lower right corner) is coupled to two adjacent scintillator rods. (The second scintillator rod with a 2-D shared window in the upper left corner is omitted for clarity.) The 2-D shared window is comprised of two asymmetric (offset), 1-D window patterns is shown.
Figure 4A:
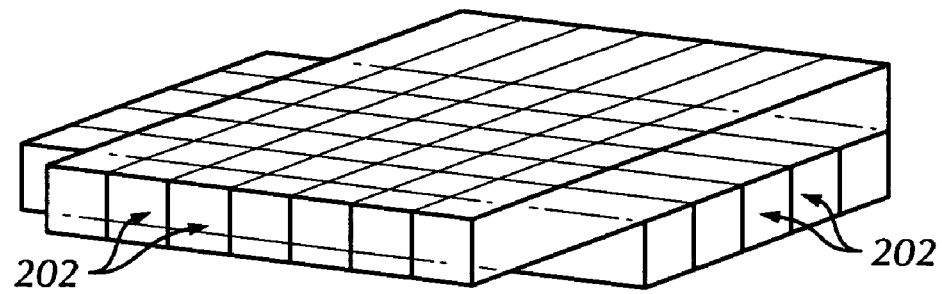
FIG. 4a illustrates a perspective view of a shared window defined by cross-coupling two edge-on scintillator rod arrays.
Figure 4B:
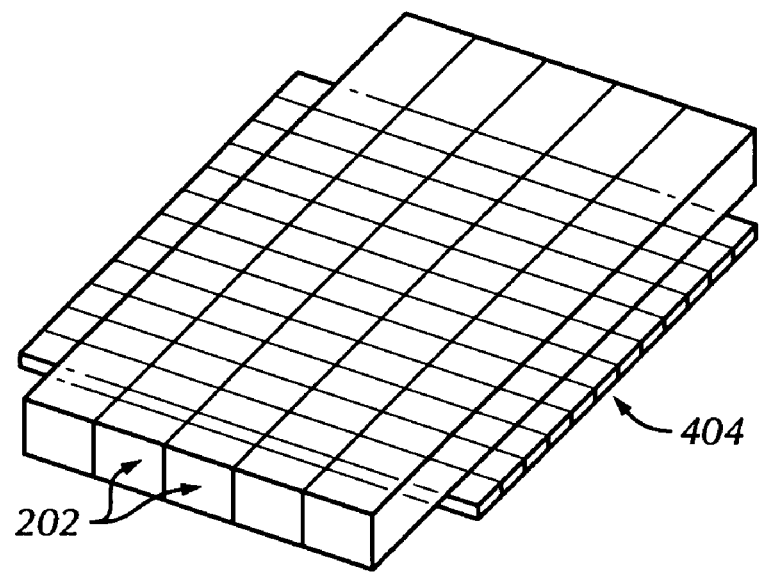
FIG. 4b illustrates a perspective view of shared window defined by cross-coupling a fiber array and an edge-on scintillator rod array.

Specific surface treatments applied to a rod can create 1-D (2-D) continuous or discrete shared windows. A 1-D shared window pattern 303 of absorptive or reflective stripes can connect two adjacent rods within or between layers (FIG. 3a). This window pattern can be limited to coupling two adjacent rods (a 2-rod cell), three adjacent rods, etc. or used to couple all of the adjacent rods within a row or column of rods. A 2-D shared window pattern 304 can connect two adjacent rods within and between layers (FIG. 3b). This shared window implementation can be limited to coupling four specific adjacent rods (a 4-rod cell). Larger cells can be formed up to the limit in which all adjacent rods throughout the 2-D array of rods are coupled. The two 1-D window patterns that comprise the 2-D shared window can be asymmetric. A simple asymmetry results if the two 1-D window patterns are shifted or offset with respect to each other (FIG. 3b). This creates an asymmetry that represents an additional means of encoding the signal. Another means of introducing an asymmetry is by using two distinctly different 1-D window patterns. (This approach can be used with the 1-D shared window of FIG. 3a for the continuous case by employing asymmetric 1-D window patterns on opposites sides of a scintillator rod.) Surface treatments techniques (including the use of WLS materials and coupling structures such as very thin fiber (or focused fiber) bundle layers or SELFOC microlenses) can be employed to create the desired window pattern. (Note that the thickness or the width of the scintillator rods could be increased if the readout signals between adjacent rods demonstrate a measurable dependence on the event location with respect to the interface between rods.) The concept of shared window patterns can be used with both rods and sub-rods. A novel implementation of this shared window design (FIG. 4a) is to define a window by cross-coupling alternate layers of scintillator rods 202. This cross-coupled window can be used to connect all layers or a specific subset of layers such as two adjacent layers. This cross-coupled window can be further defined by imposing an additional shared window pattern between cross-coupled scintillator rods. Yet a further extension of this concept is to cross-couple layers comprised of two-rod cells (or four-rod cells). For the cross-coupled rod case 2-4 1-D, 2-D, or PSAPD photodetector readout arrays can be employed. Since there are gaps between consecutive, aligned scintillator rod layers, detector design requirements can be modified to use the detector area that corresponds to the gaps to improve detector capabilities. Improvements might include reduced leakage between detector elements, increased charge storage capacity, additional on-chip electronics, an increased amplification volume, and faster response times. A related design cross-couples a planar array of scintillator rods 202 to an array of conventional or WLS fibers 404 or photoconductive strips to provide SAR information (FIG. 4b). Fibers can be readout using one or more photodetector designs including, but not limited to, (strip) SSDs, SiPM arrays, internal discrete amplification photodetector arrays, 2-D APD arrays, PSAPDs, or SA-PSAPDs (strip array PSAPDs). If the rod array is segmented using different materials, color filters can be applied to the fibers in a pattern that matches the positions of the materials. This will help reduce the level of optical signal entering a particular fiber from adjacent scintillator segments. The fibers used with an edge-on SAR scintillator rod array can be much shorter than fibers used to readout existing face-on block scintillator detector designs.

Figure 5A:
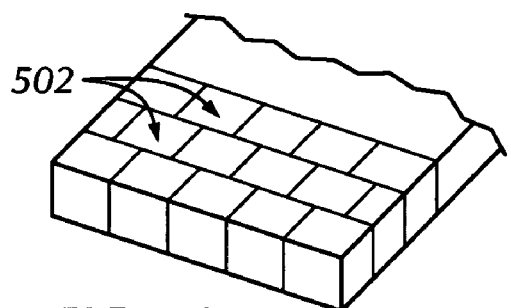
FIG. 5a illustrates a perspective view of a single layer of offset edge-on scintillator rod segments.
Figure 5B:
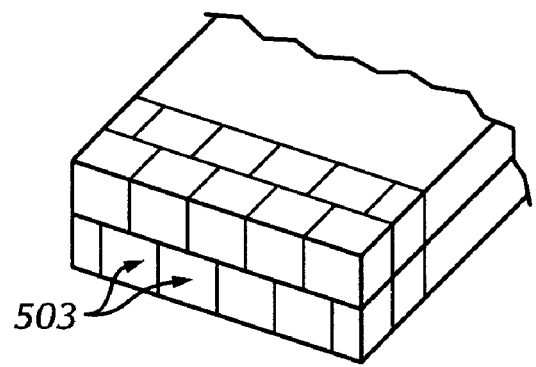
FIG. 5b illustrates a perspective view of a 2-layer cell of offset edge-on scintillator rod segments in which segments are offset within a layer and between layers.

The offset segment design involves shifting alternate rows of linear arrays of discrete scintillator rod segments by (typically) one-half rod segment causing the signal to split in a branching pattern. A 1-D offset rod segment design 502 is shown in FIG. 5a. By extension signal splitting can also be enabled between layers in a continuous manner or a cell configuration of two (or more) layers 503 (FIG. 5b). Surface treatment techniques, internal structure techniques, and structured light sharing techniques (such as shared windows) can be applied to further encode the light signals by controlling light propagation and pulse properties.

The structured light sharing geometry can also exploit pulse properties such as pulse shape and color to determine the interaction position within a cross-coupled scintillator rod array, a fiber array, or offset pixel segments.

The edge-on SAR scintillator single rod and structured light sharing rod geometries can be used within the same edge-on SAR scintillator detector module.

Structured light sharing and single scintillator rod geometries can be implemented with a one-side or a multi-side (typically two-side) readout. Single scintillator rod geometries typically utilize a two-side readout since the one-side readout format requires an assumption that detected signals are due to photoelectric interactions. In many instances the one-side readout implementations of the edge-on SAR rod designs emulate the face-on DOI rod designs described in the literature. An advantage of the edge-on SAR scintillator rod approach is that the implementations of detector properties such as the dimensions of scintillator rods, rod segments, surface treatments, internal structures, and pulse properties are no longer constrained by the need for a scintillator rod to provide a reasonable level of detection efficiency (such as scintillator rods with lengths of 30 mm for PET imaging). An edge-on, SAR scintillator rod design can implement a related face-on, DOI scintillator rod design "as is" (if it already provides adequate spatial and energy resolution) or in an aggressive manner.

There are two categories of scintillator block geometries that may be suitable for implementation as edge-on SAR scintillator detector modules: the narrow, 2-D SAR scintillator block (sheet) and the broad, 3-D SAR scintillator block. The sheet thickness typically defines one of the spatial resolution dimensions. Once again the choice of configuration and optimization technique(s) for a SPECT or PET edge-on SAR scintillator detector module will be the result of numerous trade-offs: the desired spatial resolution and uniformity, energy resolution, pulse properties (pulse shape, spectrum), scintillator IOR, energy-dependent conversion efficiency, stopping power, the energy range, the photodetector readout, the count rate, and the imaging geometry (planar or ring, large or small volume).

Figure 6:
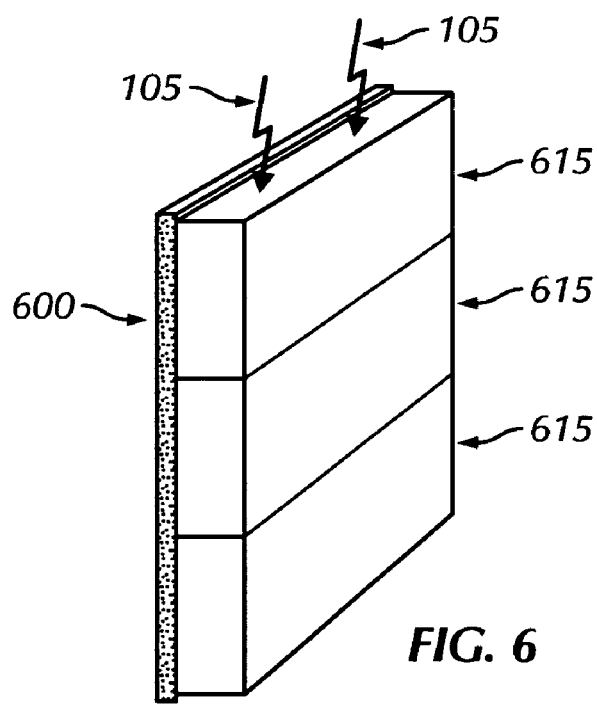
FIG. 6 illustrates a perspective view of a stack of edge-on scintillator blocks 1-3 comprised of scintillator materials 1-3 with single-side readouts.

The broad, edge-on, 3-D SAR scintillator block detector with either a one-side readout 600 (emulating a broad, face-on, 3-D DOI scintillator block detectors) or a multiple-side readout can be implemented (FIG. 6). A multiple-side readout offers improved spatial resolution but it is more expensive to implement. Multiple edge-on, 3-D SAR scintillator blocks 615 (possibly using different dimensions and/or different materials) can be stacked.

Figure 7A:
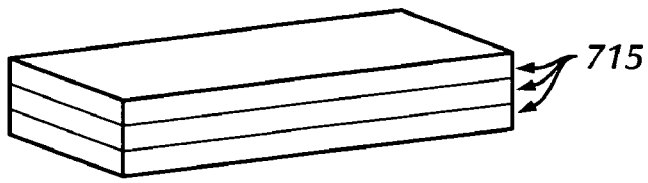
FIG. 7 illustrates perspective views of horizontal and vertical stacks of edge-on scintillator sheet.
Figure 7B:
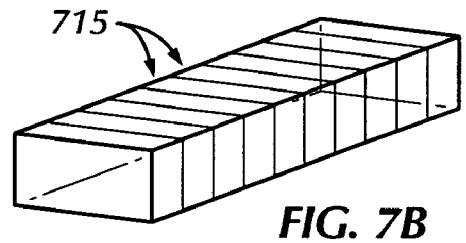
Figure 8:
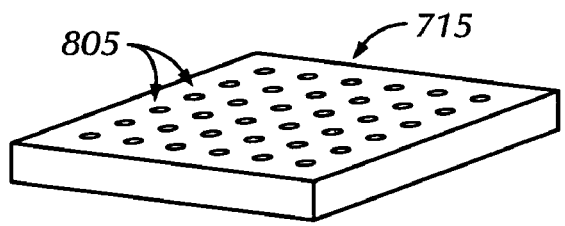
FIG. 8 illustrates a perspective view of a horizontal edge-on scintillator sheet with an internal structure consisting of an array of boreholes.
Figure 9:
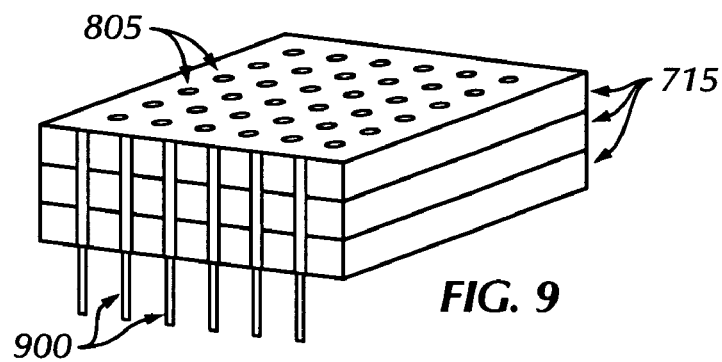
FIG. 9 illustrates a perspective view of a horizontal stack of edge-on scintillator sheet with an internal structure consisting of an array of coupled boreholes with fiber optics.

Edge-on SAR scintillator sheet designs include vertical or horizontal stacks of edge-on SAR scintillator sheets 715 (FIG. 7). Sheet thickness and material can be varied as needed. Edge-on SAR scintillator sheet can benefit from the surface treatments, internal modification, and structured light sharing techniques developed for edge-on SAR scintillator rod detector geometries. These techniques include uniform and patterned surface treatments (modifying absorption, reflection, IOR mismatches, IOR gradients, spectral properties (using WLS materials), and scattering properties as a function of position by applying coatings, controlling surface roughness, and introducing shallow surface cuts) or the use of internal structures such as sub-sheets (similar to the concept of sub-rods) and borehole arrays 805 (FIG. 8). Controlled doping of an activator material in a 2-D pattern could be used to spatially encode pulse properties. The same surface treatments, internal structures, and structured light sharing techniques used with sheets can be applied to sub-sheets. (Note that uniform and non-uniform borehole array designs can be implemented. For example, borehole patterns that simulate single rod designs such as segments (uniform grid patterns) and offset segments (offset grid patterns) can be employed.) Internal structures such as boreholes 805, as described for edge-on SAR scintillator rod arrays, can be aligned across edge-on SAR scintillator sheets and connected to a readout by fiber optics 900 or other means that provides the SAR information (FIG. 9). In addition, edge-on SAR scintillator sheets can be placed between crossed (conventional or WLS) fiber arrays. Readout can be from 2, 3, or 4 sides. (For example, one readout configuration consists of a strip photodetector coupled to the edge that is used to estimate the optical energy within a sheet while 1-D arrays of photodetector determines the x and y axis position based on reading crossed fiber arrays coupled to the upper and lower faces of the scintillator sheet. If only a single fiber array is employed to determine x and y position then it requires a dual readout.) A novel variant of the 1-D continuous or discrete shared window design between adjacent rods can be extended into a 2-D continuous or discrete shared window design between adjacent sheets. This design can be used to improve spatial resolution. Optionally, a reduction in the number of readout surfaces may be practical. (Note that the thickness of the sheets could be increased if the readout signals between adjacent sheets demonstrate a measurable dependence on the DOI position (sub-DOI resolution).)

The advantage of the edge-on SAR scintillator block design with respect to face-on scintillator block designs is that detector properties such as the dimensions of scintillator blocks, surface treatments, or the creation of internal structures are not constrained by the need to achieve a reasonable level of detection efficiency or a large detector surface area. Both of the edge-on SAR scintillator block geometries can exploit the layered "multiple scintillator material" capability discussed for edge-on SAR, scintillator rod geometries. In addition, both edge-on SAR scintillator block geometries can be used within the same edge-on SAR scintillator detector module. If advantageous, edge-on SAR scintillator block and rod geometries can be used within the same edge-on scintillator detector module. (For example, if resolution requirements are depth-dependent.) Furthermore edge-on SAR detector geometries can be combined with basic edge-on and/or face-on detector geometries to create hybrid edge-on SAR detector modules. For example, a hybrid edge-on SAR detector module suitable for use in a Compton gamma camera would use a face-on, planar 2-D Si or Ge array as the Compton scatterer followed by an edge-on SAR scintillator detector. In a different application the face-on, planar 2-D Si or Ge array might be used to detect particles such as electron while the edge-on SAR scintillator detector might be used to detect photons or other particles.

The enhanced capabilities of specific edge-on SAR scintillator rod and block detectors detailed herein can be appreciated within the context of existing DOI scintillator detector designs. Face-on, scintillator DOI techniques developed for high resolution PET include readout from front and back ends of a scintillator array (dual or two-side readout with photodetector arrays), "Phoswich" (a phoswich, or "phosphor sandwich", is a combination of scintillators with different decay time constants), offset front and back scintillator arrays, light sharing between adjacent scintillator elements, pulse shape discrimination, etc. The edge-on SAR scintillator detector modules that are motivated by the face-on DOI techniques can be used to construct high-resolution SPECT, PET, and Compton gamma cameras (as well as SPECT-PET cameras, hand-held SPECT or PET cameras, and non-medical imaging systems). Calibration of the edge-on scintillator detector modules is required in order to determine the signal strength versus photon interaction location within the scintillator element. Face-on DOI calibration techniques can be employed for this purpose, Huber J., et al., IEEE Trans. Nucl. Sci. Vol. 45, No. 3, pp. 1268-1272, June 1998 and Vaquero J., et al., IEEE Trans. Med. Imag. Vol. 17, No. 6, pp. 967-978, December 1998.

In both face-on DOI and edge-on SAR scintillator detector designs a one-side or a multi-side readout can be implemented. The multi-side readout designs typically provide improved DOI or SAR information but at a greater cost. (If the cost of a readout detector is significant then the relative advantage of a dual-readout design versus using two one-side readout designs is no longer guaranteed.) The two-side (dual) readout designs are frequently used with face-on scintillator rod array detectors because of the improved DOI response uniformity and the reduced ambiguity in the measured signal strength. Edge-on SAR scintillator detector likewise benefit from a two-side readout design. A variety of photodetectors such as photomultiplier (PMT), flat PMTs, PMT arrays, position-sensitive PMTs (PSPMTs), APDs, PSAPDs, silicon drift detectors (SDDs), SiPMs, internal discrete amplification photodetectors, photodiode arrays, $HgI_2$ arrays, etc. have been used with face-on scintillator detectors. The problem with using the dual readout DOI technique in face-on, high resolution PET (511 keV photons) imaging is that the scintillator rods have to be narrow for high resolution but they have to be long to efficiently stop 511 keV photons. The substantial length (on the order of 30 mm for a clinical system) degrades the DOI resolution and the energy resolution (due to optical signal losses). An unavoidable problem with face-on, dual-readout designs is that the front photodetector array is directly exposed to gamma rays.

An additional problem is that Compton scattering of incident radiation is biased in the forward direction such that the probability of detecting the scatter event downstream from the initial event in the same scintillator rod is not small (resulting in an inaccurate DOI estimate). The edge-on SAR scintillator rod detector design reduces the likelihood that a Compton scatter photon will be detected in the same scintillator rod. Tracking algorithm techniques developed for particle detectors and medical imaging should be highly effective due to the reduced overlap of primary and secondary events. The edge-on scintillator detector module format may reduce the cost of using certain scintillator materials. Blocks and rods with smaller dimensions (for example, a scintillator rod length of 10-20 mm versus 30 mm) may have higher manufacturing yields if the scintillator is difficult to grow in bulk or to machine.

This invention emphasizes novel and improved designs that encode how light pulses are distributed within and/or between edge-on SAR scintillator detector elements (rods or blocks) and thus the light signal distribution that reaches one or more readout surfaces.

Techniques for encoding edge-on scintillator elements may include modifying the side walls, creating internal structures within an element, sharing the light pulse between elements, and the use of multiple scintillator materials (pulse properties). Advantages of the edge-on SAR scintillator detector approach include the use of more aggressive implementations of existing DOI techniques and the ability to implement entirely new encoding techniques. The use of a particular technique or a particular implementation of a technique depends on the scintillator material properties as well as the dimensions of the scintillator element (rod or block).

Surface treatment techniques are frequently employed in order to modify (encode) the scintillator signal distribution at a readout surface. Surface treatment techniques used to alter one or more of the scintillator element surfaces (in some cases, the readout surface) as a function of position include ion implantation (altering the IOR), etching (varying the degree of surface roughness), cutting shallow surface patterns (straight or angled, crosscut, variable angle or depth with position, alternating patterns, etc.), and applying absorptive or reflective coatings in patterns, etc. A fraction of the scintillation signal is attenuated or redirected. Researchers have evaluated a number of surface treatment schemes including varying the degree of roughness, the use of specular (mirror and directional) and diffuse reflective coatings, absorptive paint patterns, surface cuts, etc. in order to control the scintillator rod light distribution for DOI information, see e.g., Burr K., et al., IEEE Trans. Nucl. Sci. Vol. 51, No. 4, pp. 1791-1798, August 2004, and Rothfuss H., et al., IEEE Trans. Nucl. Sci. Vol. 51, No. 3, pp. 770-774, June 2004, and Shao Y., et al., IEEE Trans. Nucl. Sci. Vol. 49, No. 3, pp. 649-654, June 2002.

Internal structures can be introduced into a scintillator rod or sheet. Segments (surfaces with IOR mismatches; reflective, absorbing, or focusing patterns), sub-rods, and borehole patterns (physical holes or induced IOR modifications of various shapes) can be added to scintillator rods. The material can be varied by segment (if desired) in order to exploit pulse properties using pulse shape analysis (PSA) or color information. Continuous and partial borehole patterns implemented with physical and virtual boreholes can be added to scintillator sheets. Physical borehole can be left as open holes, coated (with directional or non-directional coatings that may be reflective, absorptive, WLS, photoemissive, photoconductive, etc.), or filled with a material such as photodetector or fiber (conventional or WLS). Borehole patterns can be used to help channel the spread of a light signal within the scintillator material.

Sharing the light pulse between scintillator rods can include coupling by shared windows or offset segments. Shared windows can result from continuous contact or discrete windows (created by surface treatments, cross-coupled alternate layers of scintillator rod arrays via continuous contact or discrete windows, or thin fiber bundle layers). An example of offset segments is a row of scintillator elements in a 2-D array that is offset or shifted with respect to the adjacent rows. The offset element geometry may reduce imaging problems related to spatial resolution artifacts. Materials can be varied in order to utilize PSA and/or color information. Thus the scintillator rods coupled by continuous contact or discrete windows could be segmented scintillator rods that use more than one scintillator material. Individual scintillator arrays of rods in a cross-coupled geometry could each use a distinct material and by extension, provide additional encoding of rods within an array. The elements in the offset element geometry can use more than one material. The use of multiple scintillator materials exploits the well-known concept of encoding position within a detector plane based on pulse shape. (A novel feature is to encode position within a detector plane based on spectral distribution. This requires color-sensing capability using either color filters with the photodetector readout detector or by exploiting the response characteristics of the photodetector readout detector.)

Thus encoding techniques developed for one-side or two-side (or multi-side), face-on DOI scintillator elements (rods and blocks) can be applied aggressively to edge-on SAR scintillator elements. In addition, novel encoding techniques can be applied to edge-on SAR scintillator elements.

The flexibility of the edge-on SAR scintillator detector approach is demonstrated by the ability to manipulate parameters such as the scintillator material or cross section as a function of depth and thus manipulate the response to incident radiation parameters such as the radiation type, energy, polarization, spin, etc. (The basic edge-on scintillator array with DOI capability is described in Nelson, U.S. Pat. No. 4,560,882.) In addition, a number of readout detector configurations are permitted.

It is straightforward to layer (stack) different scintillator materials within an edge-on SAR scintillator detector module in order to image radiation with multiple energies (such as a SPECT-PET gamma ray detector) or multiple radiation types (such as photons and neutrons, electrons, etc.). In addition face-on scintillator and non-scintillator materials (attenuators, converters, polarizers, and sensors such as semiconductor arrays, microchannel plate, amplifiers, gases, etc.) can be positioned adjacent to edge-on SAR scintillator layers in order to detect or attenuate radiation particles with different energies or properties (including primary or secondary radiation), or to act as radiation converters. (Radiation converters have been used in high energy physics, gamma ray astronomy, neutron imaging, and high energy industrial radiography and radiation therapy imaging.) Thus, multi-material edge-on SAR scintillator detector modules can be constructed from more than one scintillator material and from combinations of scintillator and non-scintillator materials.

Detector module designs utilizing material depth-dependence would be suitable for multiple-energy SPECT imaging or SPECT and PET imaging. (The design could also be used to image multiple types of particles, such as beta emissions and gamma rays or x-rays, at the same time.) A SPECT-PET camera might use a scintillator material such as NaI(Tl), LaBr$_3$ or CsI(Tl) for imaging low energy gamma rays followed by LSO for imaging 511 keV gamma rays. LSO could represent a problem for SPECT imaging. The radiation from $^{176}$Lu could introduce a background signal in the low energy detector material. This background signal in the low energy detector material can be reduced by using energy windows to reject a fraction of the background events. Further reductions are possible by inserting a layer of an absorber material between the LSO and the adjacent scintillator materials.

An alternative is to modify the design and replace the radioactive LSO with a different PET scintillator material. The layered scintillator material design can be employed even if only one photon (or particle) energy is imaged. If scintillator elements in adjacent layers of rods (including crossed rods) or sheets employ structured light sharing techniques (including shared windows with WLS materials) then the materials in adjacent layers may be selected to have different pulse properties (pulse shape, spectrum). Thus materials in adjacent layers can differ according to composition (LSO, YLSO, GSO) or concentration of an activator such as Ce in LSO. The edge-on SAR detector design is highly flexible. Layering materials is not the only option. Scintillator rod materials (and non-scintillator materials) can be varied within a layer to optimize the response to spatially-dependent radiation. For example the central region might detect photons or particles with specific properties that differ from the outer regions or the central region might act as a converter or particle polarizer.

Although a uniform ("x"="y") rectangular cross section for the scintillator rods is straightforward to implement, non-uniform rectangular cross sections can be used. For example, the vertical (or DOI) resolution requirements may differ from the horizontal resolution requirements or they may vary with depth. A rod cross section in which the "x" and "y" values differ could allow a reduction in the total number of scintillator rods required. Another example is the PET ring detector design. A particular SAR implementation with rods in an axial orientation could form a set of concentric scintillator rings in which rods have an annular cross-section as seen from along the axis of the ring detector. In this case the edge-on SAR scintillator rod determines the axial resolution.

The choice of readout detectors (and costs) may be tailored to provide discreet or shared readout capabilities. The number of readout elements needed for high resolution SPECT, PET, and Compton imaging systems is a concern for both face-on and edge-on detector designs. One method to reduce the number of readout elements is to share readouts across pixels (assuming acceptable detector dead time) was exploited in the original Anger gamma camera. A single scintillation crystal was viewed by a 2-D array of PMTs and the centroid of the signal is estimated. More recent developments exploiting this approach incorporated into this invention include position sensitive PMTs (PSPMTs) and PSAPDs (with readout electrodes at the four corners of a rectangle. These technologies can be utilized with the edge-on scintillator array design.

In another aspect, a readout technique originally developed for semiconductor detectors, the cross strip array with perpendicular anode and cathode strip arrays on opposite sides of the detector plane, can be used in this invention for scintillator arrays in either an edge-on geometry (FIG. 1) or a face-on geometry. A 1-D (linear) array of strip photosensors (such as a PD or APD strip array) 100 is positioned on one end of the scintillator rod array 102 and a second linear array of strip photosensors 100 is positioned on the opposite end of the scintillator rod array at right angles to the first linear array of strip photosensors. Thus 3-D positioning for incident radiation 105 can be determined with 2 linear arrays of strip photosensors in edge-on or face-on geometries. Alternatives are a combination of two 2-D readout arrays or a 2-D array and a 1-D array (which can be oriented to deal with directional scatter). The combination of two 2-D readout arrays offers the lowest readout noise (the readout surface area is matched to the cross section of the scintillator rod) and the smallest dead time (a pair of readout elements see a single scintillator rod, a pair of crossed strip readout elements see two crossed scintillator planes). Although the dual readout technique can be implemented with pairs of 1-D or 2-D photodetector arrays or combinations thereof, it may be advantageous to use even fewer readout elements. PSAPDs with only four readout electrodes (contacts) dramatically lower the readout element count, Shah K., et al., IEEE Trans. Nucl. Sci. Vol. 49, No. 4, pp. 1687-1691, August 2002 (see FIG. 1, p. 1688). Unfortunately the minimum detector dead time will increase since multiple scintillator rods are viewed simultaneously by a single photosensitive surface.

Figure 10A:
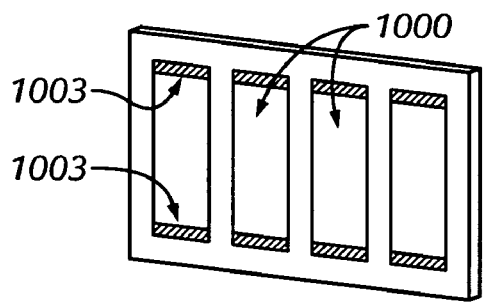
FIG. 10a illustrates a perspective view of a strip array PSAPD wherein each strip is provided with dual readout electrodes (a SA-PSAPD).

A novel alternative to existing low-noise readout designs such as the (strip) SDD and the (area) PSAPD described by Shah are segmented SDD and PSAPDs. For example, the PSAPD is segmented into strips and thus forming a strip array PSAPD or SA-PSAPD (FIG. 10a). The SA-PSAPD divides the PSAPD active area into strips 1000 and uses two readout electrodes 1003 located at the ends of the PSAPD strips rather than four readout electrodes located at the corners of a rectangle. The position of an event along the length of the strip can then be determined by the charge sharing between two electrodes rather than four electrodes. The typical readout signal level per electrode should increase and the readout noise should decrease due to a reduction in surface area (capacitance) and the comparison of two rather than four readout signals. Both PSAPDs and SA-PSAPDs provide 2-D spatial information. The SA-PSAPD provides decreased detector dead time (since each strip looks at a single layer of the entire scintillator volume). SA-PSAPDs can be used for their 2-D readout capabilities in place of PSAPDs and 2-D APD arrays or simply as strip arrays.

In one aspect, the invention provides multi-pixels SiPM designs and multi-pixel internal discrete amplification photodetector designs in which a subgroup of pixels share a common output for the total energy of the signal and provide a weighted spatial location; in some aspects these are implemented to simplify readout requirements. In one aspect, if the photodetector pixels are sufficiently small that two or more are coupled to face of a scintillator straw, then they can share a common output for the total energy of the signal and provide a weighted spatial location. In one aspect, this weighted spatial location information is used to enhance the SAR or DOI position estimate since the optical signal distribution on the output face (or output faces) of a scintillator straw may be correlated to the event location within the scintillator straw. An alternative implementation is to retain the data from the individual pixels of the subgroup and apply sophisticated positioning algorithms similar to those used with conventional gamma cameras that are readout by multiple PMTs or with block detectors.

Figure 10B:
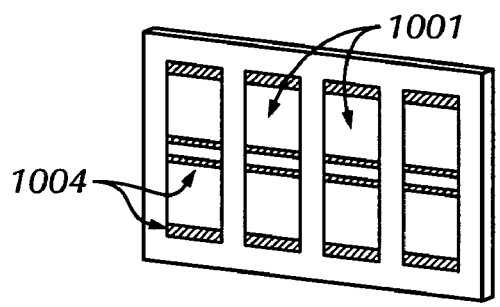
FIG. 10b illustrates a perspective view of a strip array PSAPD wherein each strip is divided into multiple sub-strips and each sub-strip is provided with dual readout electrodes (a SSA-PSAPD).

The SA-PSAPD can be used to readout face-on DOI scintillator rod arrays and basic edge-on scintillator arrays (providing DOI information) as well as edge-on SAR scintillator rod arrays. If used with a basic edge-on scintillator array DOI information may be controlled by segmenting the scintillator rods (using IOR mismatches or reflectors) and using surface treatment techniques, Nelson U.S. Pat. No. 4,560,882. A problem may arise if individual SA-PSAPD strips are required to be exceedingly long in order to readout a long row or column of scintillator rods, leading to excessive readout noise and/or dead detector volume during an event. The SA-PSAPD strips can be segmented into sub-strips 1001 wherein each sub-strip has dual readout electrodes 1004 located at the ends of the sub-strips (FIG. 10b). The number of readout electrodes in the SSA-PSAPD would increase relative to the dual readout implementation but it could still be comparatively small compared to a full 2-D pixellated readout. The sub-strips within a strip can have different lengths if needed to match a non-uniform scintillator rod pattern. (Note that a similar modification to the detector element geometry of a 2-D photodiode (PD) or APD uniform pixel array would create a 2-D PD or APD sub-strip (pixel) array.) A strip SDD array can also be divided into sub-strips (pixels). In this case sub-strip SDD (SS-SDD) arrays also benefit from a reduction in noise per readout sub-strip and a reduction in detector dead time since each sub-strip views far fewer rods simultaneously compared to a full strip. The approach of creating sub-elements of a standard detector element such as a strip can be applied to the PSAPD. For example, the area of a PSAPD can be segmented into two, three, or more sub-areas (each with four readout electrodes), creating a sub-area array of PSAPDs (SAA-PSAPD). This design reduces readout noise and dead time compared to a large area PSAPD and it views a different set of scintillator rods than what a SA-PSAPD views (a row or column). Note that both strip and sub-area array PSAPDs can be combined on the same readout detector (a mixed PSAPD detector) permitting variable resolution to match specific scintillator rod configurations. For example, depth resolution requirements (and sometimes 2-D spatial resolution requirements) may vary based on the radiation type and energy (multiple energy imaging with photon and/or particle is encountered in nuclear medicine, radiation therapy, high energy physics, astronomy, etc.). These additional readout detector options permit a finer level of control as to readout noise, dead time, the detection of directional scatter, and cost. In some aspects, these readout geometries are implemented using SiPM arrays or internal discrete amplification photodetector arrays.

In another aspect, as an alternative to the strip photodetector readout, the invention uses a fiber strip array coupled to a low noise readout. The fiber can be conventional or a WLS fiber. In some aspects, the fiber readout may be in terms of cost, limited interaction with incident radiation or radiation by-products, or long-term reliability. These fiber strip arrays become more cost-effective to use relative to photodetector arrays as the length of the fiber coupled to the scintillator material increases.

Although FIG. 4b shows the fibers coupled perpendicular to the length of the scintillator straws, in alternative aspects the fibers can also be coupled parallel to the length of the scintillator straws. Coupling between fiber and scintillator can be enhanced by implementing shallow angled cuts (or IOR changes) in the fiber to direct more optical photons toward the readout end of the fiber. (This eliminates issues related to the non-uniform detector volume created by making shallow cuts within the walls of the scintillator crystals.) Fiber readouts can be used with face-on, edge-on SAR, and crossed edge-on SAR detector configurations. Fiber readouts may be used to provide improved SAR, DOI, or timing resolution (in which the fiber signal is readout by a separate high speed photodetector such as a SiPM or internal discrete amplification photodetector). Fiber readouts in general and fiber readouts with shallow angle cuts (or other surface treatments) in particular may be used to improve overall light collection efficiency and uniformity for face-on x-ray and nuclear medicine imaging applications (including hand held probes). In this instance the fibers are oriented parallel to the length of the scintillator straws. Consider an area, slit, or slot (flat or focused) face-on radiation therapy portal imaging detector (or a Mega-voltage CT detector) with tall scintillator straws (mms to 10 s of mms in length). Low energy x-rays preferentially stopped near the front face produce smaller optical photon signals and lose a larger fraction of photons migrating toward the readout detector. Fibers with shallow angled cuts could be coupled parallel to these fiber straws edge-on and readout with the same photodetectors that the scintillator straws use.

The improved techniques and novel readout detectors described herein to create high resolution edge-on SAR detector modules may be implemented with face-on DOI rod and block detectors in order to improve DOI resolution.

Planar and certain ring detectors assembled from edge-on SAR scintillator detector modules benefit from the use of relatively thin, low-noise photodetector arrays such as PD arrays, APD arrays, PSAPDs, SDDs, SiPMs, internal discrete amplification photodetectors, $HgI_2$ array, new segmented arrays, etc. Thin detectors minimize the dead space between adjacent detector modules. Edge-on scintillator detector modules that use PMT arrays (or PSPMTs) for readout tend to limit the concept of a detector module. The PMT arrays are too thick to build arrays of detector modules with non-intrusive gaps between detector modules. This limitation of PMT arrays is highlighted by recurring efforts to implement an axial-on (edge-on SAR) scintillator ring detector for PET imaging.

The axial-on scintillator ring detector for PET is a non-modular single detector ring comprised of edge-on scintillator rod elements aligned with the axis of the PET system. Thick photoemissive detectors such as PMTs or position sensitive PMTs (PSPMTs) provide a dual readout. The thickness of the PMT arrays at the ends of the rods is sufficiently large that prohibitively large gaps would exist between adjacent detector rings. This detector design is highly constraining since the length of the scintillator rods must be sufficiently great (at least 100 mm) to image a small organ or small animal which in turn requires readout photodetectors (PMTs) that provide very large signal amplification and dynamic range (due to the significant light losses that may occur within the extremely long scintillator rods). Another drawback of the axial-on scintillator ring detector design is the cost of manufacturing very long scintillator rods. (Not all scintillator materials can be grown in a large boule format like NaI(Tl) and CsI(Tl) or processed as a ceramic.) An early example of this approach was implemented in the PETT-IV system in which a ring of NaI(Tl) rods (50 mm diameter, 170 mm long) were coupled to PMTs at both ends, Mullani N., et al., IEEE Trans. Nucl. Sci. Vol. 25, No. 1, pp. 180-183, February 1978. The axial-on SAR was 16 mm FWHM. Shimizu described a PET ring detector that used arrays of $3\times5\times50$ mm$^3$ BGO crystals coupled at both ends to a position sensitive PMT (PSPMT), Shimizu K., et al., IEEE Trans. Nucl. Sci. Vol. 35, No. 1, pp. 717-720, February 1988. The average axial-on SAR was 9.5 mm FWHM. The possibility of extending the length to 100 mm was discussed. A recent study by Braem involved coupling a 2-D hybrid photoemissive-photodiode array to each end of a scintillator array using $3.2\times3.2\times100$ mm$^3$ YAP crystals, Braem A., et al., Nuc. Instr. Meth. Phys. Res. A Vol. 525, pp. 268-274, 2004. Braem "estimated" that with improved system components an axial-on SAR uncertainty on the order of 5 mm FWHM was possible. This predicted "attainable" SAR is not considered to be "high-resolution" (typically 1-3 mm) by current PET standards.

Figure 11A:
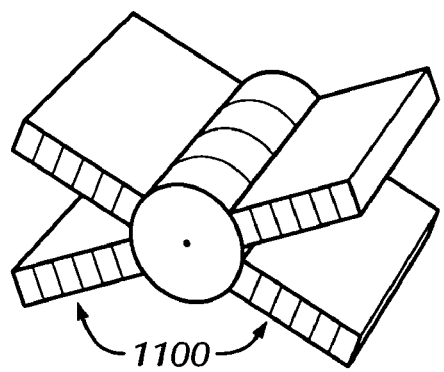
FIG. 11a illustrates a perspective view of an axial edge-on SAR scintillator ring PET detector configuration with a uniform rectangular geometry.

This non-modular, axial-on scintillator ring detector design can be made somewhat-modular and thus extended to a detector array of two rings (in one aspect, comprise shorter scintillator rods) if at one end of the scintillator rod array the PMT array is replaced by a thin PSAPD, SiPM array, internal discrete amplification photodetector array, APD array, or SDD array (for example). In one aspect, butt the ring detectors at the sides with the thin PSAPD, SiPM array, internal discrete amplification photodetector array, APD array, or SDD arrays. A modular design is possible if only thin PSAPDs, SiPM array, internal discrete amplification photodetector array, APD arrays, or SDD arrays are used to readout the ends of the rods. Then a modular, axial-on ring detector comprised of multiple axial-on detector modules can be assembled. The axial-on design employed by Braem is implemented using the conventional, two-side readout format. The edge-on SAR detector module design for axial-on imaging can be implemented using either the one-side or two-side readout format. The flexibility of the edge-on SAR scintillator detector format permits an alternate modular, axial edge-on SAR scintillator ring detector for PET that eliminates the need to butt axial-on scintillator detector modules (FIG. 11a). (Note that if the gaps between adjacent edge-on SAR scintillator detector modules 1100 shown in FIG. 11a are sufficiently large then the requirement for thin photodetectors can be relaxed. Relatively thin photoemissive detectors could be employed. Another example is hand-held detectors (including surgical probes) that use a single edge-on SAR scintillator detector module with a two-side readout or butted edge-on SAR scintillator detector modules with one-side readouts could also use relatively thin photoemissive detectors coupled to the exterior scintillator surfaces.)

Figure 11B:
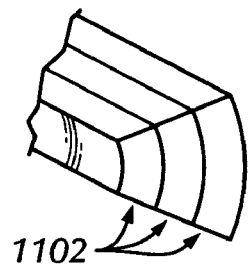
FIG. 11b illustrates a perspective view of axial-on SAR scintillator rods with an annular cross section that increases with radius suitable for a ring PET detector configuration.
Figure 11C:
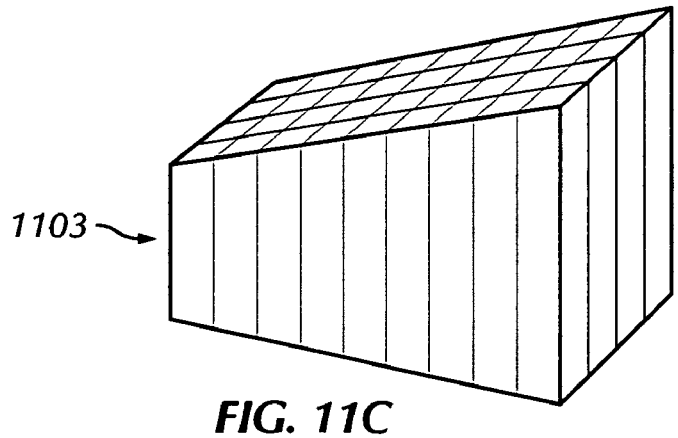
FIG. 11c illustrates a perspective view of an axial edge-on SAR scintillator ring PET detector configuration with a truncated-triangle (wedge) geometry.

Although a uniform rectangular geometry using scintillator rods with a uniform rectangular cross section is straightforward to implement for either design (FIG. 11a) a limitation is that radial gaps will be present in the ring detector volume. This effect can be mitigated for the axial-on SAR scintillator ring geometry by using scintillator rods with a "non-uniform" wedge-shaped cross section (an annular cross-section 1102) that expands as the radius increases (FIG. 11b). Changes to the scintillator rod design parameters may be needed in order to compensate for the effect of the non-uniform cross section on the signal distribution. Planar readout devices can still be employed although a PSAPD readout simplifies the need for a custom readout device with non-uniform pixel elements. The modular, axial edge-on SAR scintillator ring detector permits a different solution to the problem of gaps in the scintillator volume. The ends of an array of rectangular edge-on scintillator rods can be cut at an angle creating a truncated-triangle (wedge) geometry 1103 as seen from a side perspective (FIG. 11c). This eliminates the cost of manufacturing detector rods with a non-uniform cross section and permits the use of uniform planar readout devices such as strip array and 2-D photodetectors (as well as PSAPDs). The scintillator rod design parameters need to be modified to correct for the fact that the rod length increases with radius in this design. For both axial-on and axial edge-on SAR scintillator detector designs can be implemented with scintillator blocks in place of scintillator rods.

Although the embodiments of the present invention have been described in terms of its use for nuclear medicine (SPECT, PET, Compton camera, SPECT-PET camera, and hand-held SPECT or PET camera) imaging applications, the present invention may also be used for other medical radiographic imaging applications such as radiation therapy portal and CT imaging, PET-CT imaging, as well as industrial and scientific applications. Edge-on scintillator detector modules with SAR capability can be used not only for medical imaging applications but also non-medical applications such as mine detection, military and hazardous radiation material detection, neutron radiography and CT imaging, high energy physics, and astronomy. Other suitable applications that employ high energy photons include industrial radiography and CT imaging. For conventional fan-beam CT imaging (rather than cone-beam CT imaging) it is convenient to have the apertures (unless they extend for only a few pixels) positioned parallel to the CT axis (axial-on). If x-ray fluence rates are too high to exploit SAR effectively then basic edge-on scintillator designs (Nelson, U.S. Pat. No. 4,560,882) should be employed. Then, at least in this aspect, it is preferred to position the detector planes parallel to the CT axis (Nelson, U.S. Pat. No. 6,583,420). Thus the modular, edge-on scintillator ring detector design is suitable for high resolution PET, CT, and by extension PET-CT systems using either edge-on SAR scintillator modules or basic edge-on scintillator modules.

Edge-On Imaging Probe Detectors

The invention also provides edge-on imaging probe detectors for use in nuclear medicine, such as radiation therapy portal imaging, or for use in nuclear remediation, mine detection, container inspection, and high energy physics and astronomy. The invention provides products of manufacture, apparatus, devices and designs for edge-on imaging probe detectors for a variety of purposes, including medicine, e.g., nuclear medicine, homeland security, including airport, train, border, or port (ship) security (e.g., inspecting shipping containers, cargo, bags, cars, trucks and the like), and the like.

In alternative aspects, edge-on detector modules of the invention can comprise edge-on scintillator and/or semiconductor detectors, readout and processing electronics, power management, communications, temperature control, and/or radiation shielding, as well as several edge-on detector module array configurations, e.g., as described in Nelson, U.S. Pat. No. 6,583,420; Nelson, U.S. Pat. Appl. publication No. 20040251419; Nelson, U.S. Patent Office Disclosure Document No. 567471. Elements of SAR edge-on semiconductor and scintillator detector modules and gamma cameras that can be incorporated into the products of manufacture, apparatus, devices and designs are described, e.g., in Nelson, U.S. Pat. Appl. publication No. 20040251419; Nelson, U.S. Pat. Appl. No. 60/667,824. Specific 1-D and 2-D edge-on scintillator and semiconductor detectors (including DOI capability) without SAR capabilities are described in Nelson, U.S. Pat. No. 4,560,882 and Nelson, U.S. Pat. No. 4,937,453. Exemplary manufacturing techniques to build structured 1-D and 2-D scintillator arrays of the invention for radiation detection are described, e.g., in Nelson, U.S. Pat. No. 5,258,145.

An exemplary detector configuration for edge-on semiconductor and scintillator imaging probe detectors will be the result of numerous trade-offs: detector surface area, desired spatial resolution and uniformity, energy resolution, pulse properties (pulse shape, spectrum), signal readout electronic circuitry, scintillator IOR, energy-dependent conversion efficiency, stopping power, the operational energy range, the types of particles, the scintillator photodetector readout, and the maximum count rate. For example, the choice of scintillator photodetectors (and costs) may be tailored to provide discreet or shared readout capabilities. In addition to silicon drift detectors (SDDs), photodiode arrays, Geiger-mode silicon photomultiplier (SiPM) arrays, internal discrete amplification photodetector arrays, and APD arrays, position-sensitive APDs (PSAPDs) may be used to reduce the number of readout elements (Shah K., et al., IEEE Trans. Nucl. Sci. Vol. 49, No. 4, pp. 1687-1691, August 2002). Unfortunately the minimum detector dead time will increase. An intermediate approach is the use of segmented SDD and PSAPDs (Nelson, U.S. Pat. Appl. No. 60/667,824). A number of semiconductor detector architectures are suitable for use in edge-on imaging including (but not limited to) single elements, strip arrays, crossed strip arrays, pixellated arrays, and '3D' designs in which the 'p' and 'n' readout electrodes are perpendicular to the surface (Morse J, et al., Nuc. Instr. Meth. Phys. Res. A 524, pp. 236-234, 2004).

In one embodiment of the invention, as illustrated in FIG. 12a, a detector array 1000, can incorporates separate, discrete detector modules 102, illustrated here as 1-D, edge-on strip detectors 101, configured in a planar geometry to optimize the detection of incident radiation 107. Detector modules 102 utilize 1-D or 2-D array detectors that can have different properties. Each module 102 also includes a base 106 and a communications link 103. The base 106 can comprise detector electronics, power management components, temperature control components, and a data or information channel for communicating with a computer system. The base 106 may also incorporate a module electronic readout unit that includes a signal conditioner or filter, an amplifier, an analog-to-digital converter, and a communication interface. Additionally, the detector module 102 may be coupled to an electronically-controlled thermoelectric cooler or other temperature regulating device that resides in the detector module base 106. In this embodiment, the temperature-regulating device provides temperature control for the detector module 102 and its electronic readout unit. The communications link 103 provides power to the module 102 and connects the base 106 to a computer system. Through the attachment with the base 106, the link 103 enables a computer system to monitor and adjust the module 102 electronic settings and temperature as well as setting any application-dependent configuration parameters. The communication link 103 can be used to off-load the digitized detector radiation data to a computer system for analysis, image reconstruction, and data storage.

Basic Edge-on Imaging Probe Detector Geometries

Arrays of basic edge-on semiconductor and scintillator detector planes are available in 1-D (strip) and 2-D (crossed strip, pixellated, 3D designs, etc.) geometries, and these can be used to construct 2-D and 3-D imaging probes of the invention. Variations of these designs of the invention include stacking (layering) basic edge-on arrays as well as combining basic edge-on semiconductor and scintillator detector planes within a single imaging probe.

For example, in one aspect, a central detector comprising an array of basic edge-on scintillator or semiconductor planes could be surrounded at the periphery by basic edge-on scintillator or semiconductor planes (with a collimator in between inner and outer groups of detectors) to create an edge-on dual-detector probe (Hickernell T., et al., J. Nucl. Med. Vol. 29, No. 6, pp. 1101-1106, June 1988). In this aspect, the basic edge-on detectors positioned at the periphery would be used to measure the background radiation signal while the central detector would be used to locate the tumor.

Figure 12B:
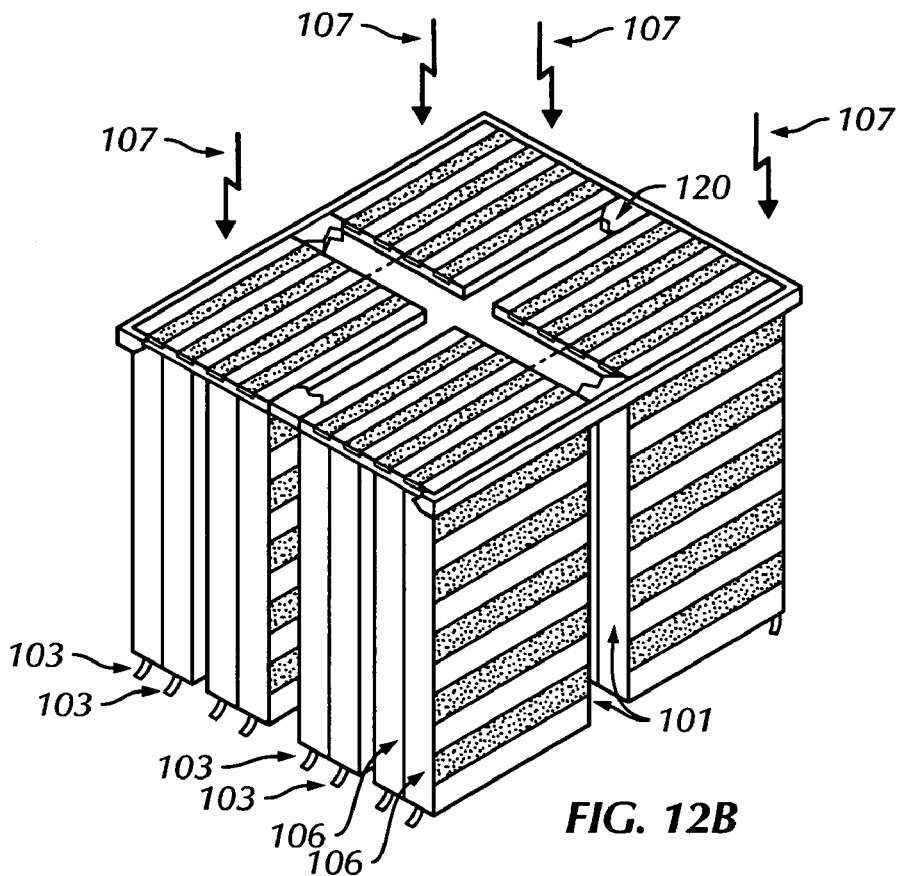
FIG. 12b illustrates a perspective view of an array of basic, 1-D edge-on semiconductor detectors assembled as a 4-quadrant edge-on imaging probe detector with internal collimator (not shown for clarity).

FIG. 12a illustrates a perspective view of an exemplary array 1000 of basic, 1-D edge-on semiconductor detectors 101 assembled as a 2-D edge-on detector array used in an edge-on imaging probe detector. FIG. 12b illustrates a perspective view of an array of basic, 1-D edge-on semiconductor detectors 101 assembled as a 4-quadrant edge-on detector array with an internal collimator 120 (not shown) used in an edge-on imaging probe. The use of 1-D edge-on semiconductor detector arrays with an aperture height of 3 mm and a strip length of 12 mm provides an imaging probe detector with an active area on the order of 24×24 mm$^2$. The internal collimator consists of a pair of crossed tungsten or lead sheets creating 4 quadrants. Although the x-y spatial resolution is limited compared to the detector array shown in FIG. 12a there is now DOI capability (z resolution) that can be used to distinguish different particles and their energy dependencies. This 4-quadrant edge-on detector with an internal collimator can be used in place of an array of basic edge-on detectors to form the central detector of an edge-on dual-detector probe.

Figure 13A:
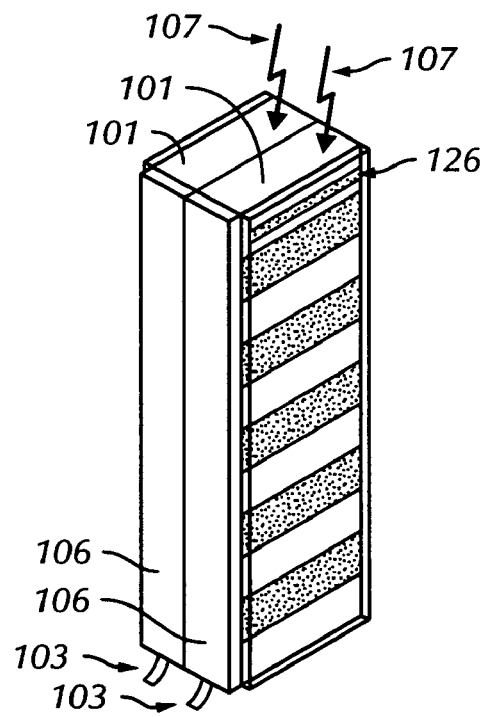
FIG. 13a illustrates a perspective view of a butted pair of basic, 1-D edge-on semiconductor detectors with variable anode strip pitch near the radiation entrance surface suitable for use in a 4-quadrant edge-on imaging probe detector.
Figure 13B:
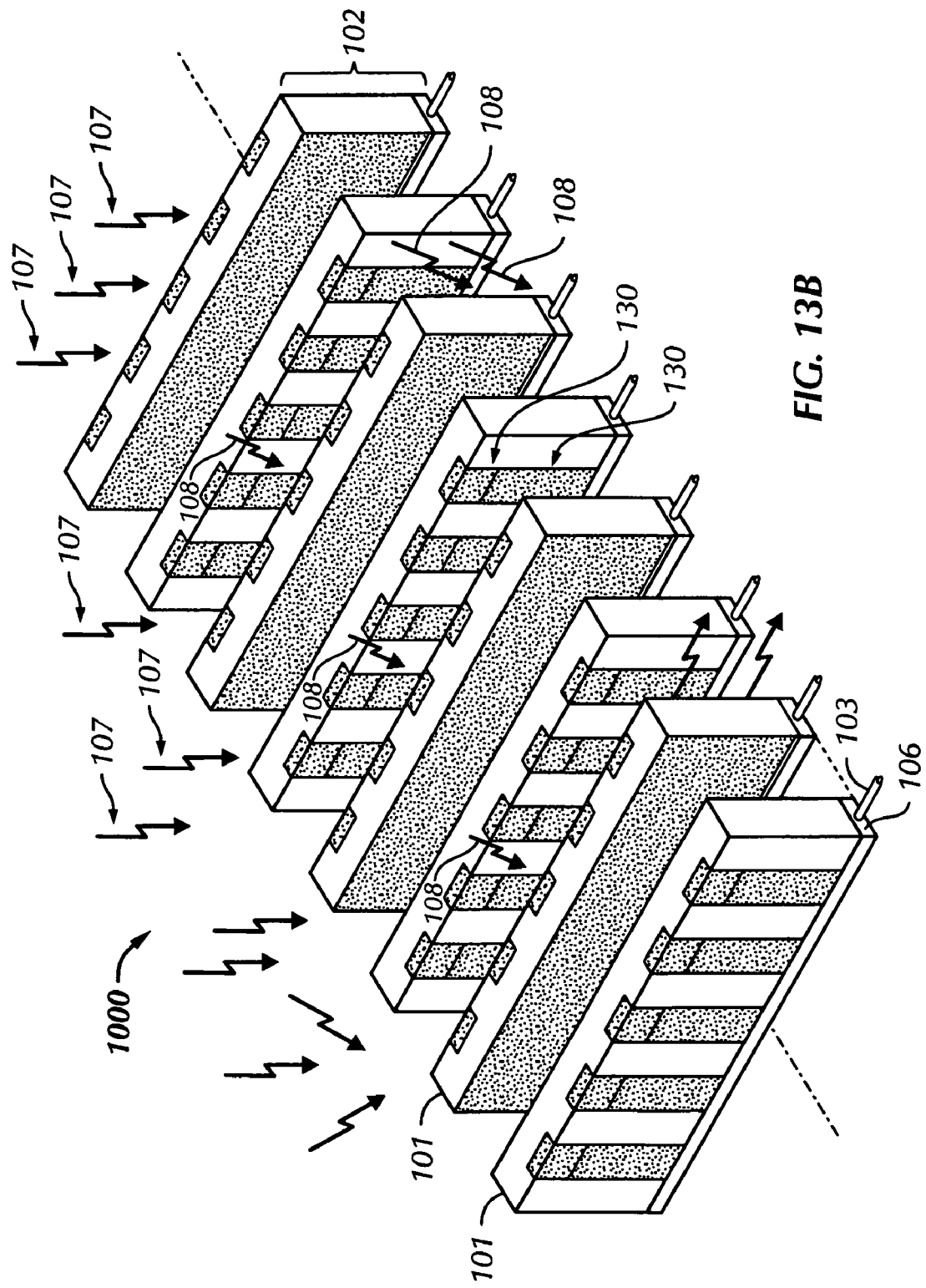
FIG. 13b illustrates a perspective view of an array of limited, basic, 2-D edge-on semiconductor detector with a segmented anode strip (variable anode strip pitch along the vertical direction near the entrance surface).

FIG. 13a illustrates a perspective view of an exemplary butted pair of basic, 1-D edge-on semiconductor detectors 101 with variable anode strip pitch 126 near the radiation 107 entrance surface suitable for use in a 4-quadrant edge-on imaging probe detector. For the scintillator case the rod material has also been altered to reduce interactions with high energy x-rays and gamma rays. The 2-D resolution shown in FIG. 12a can be maintained while adding limited DOI resolution (and so reducing the number of readout elements relative to using basic, 2-D edge-on planar crossed strip with a uniform strip pitch). FIG. 13b illustrates a perspective view of an array 1000 of limited, basic, 2-D edge-on semiconductor detectors with segmented anode readout strips 130. In this specific case there is a variable anode strip pitch along the vertical direction near the entrance surface. The choice of whether to use anode or cathode readout strips may depend on the choice of semiconductor material and readout circuitry.

Figure 13C:
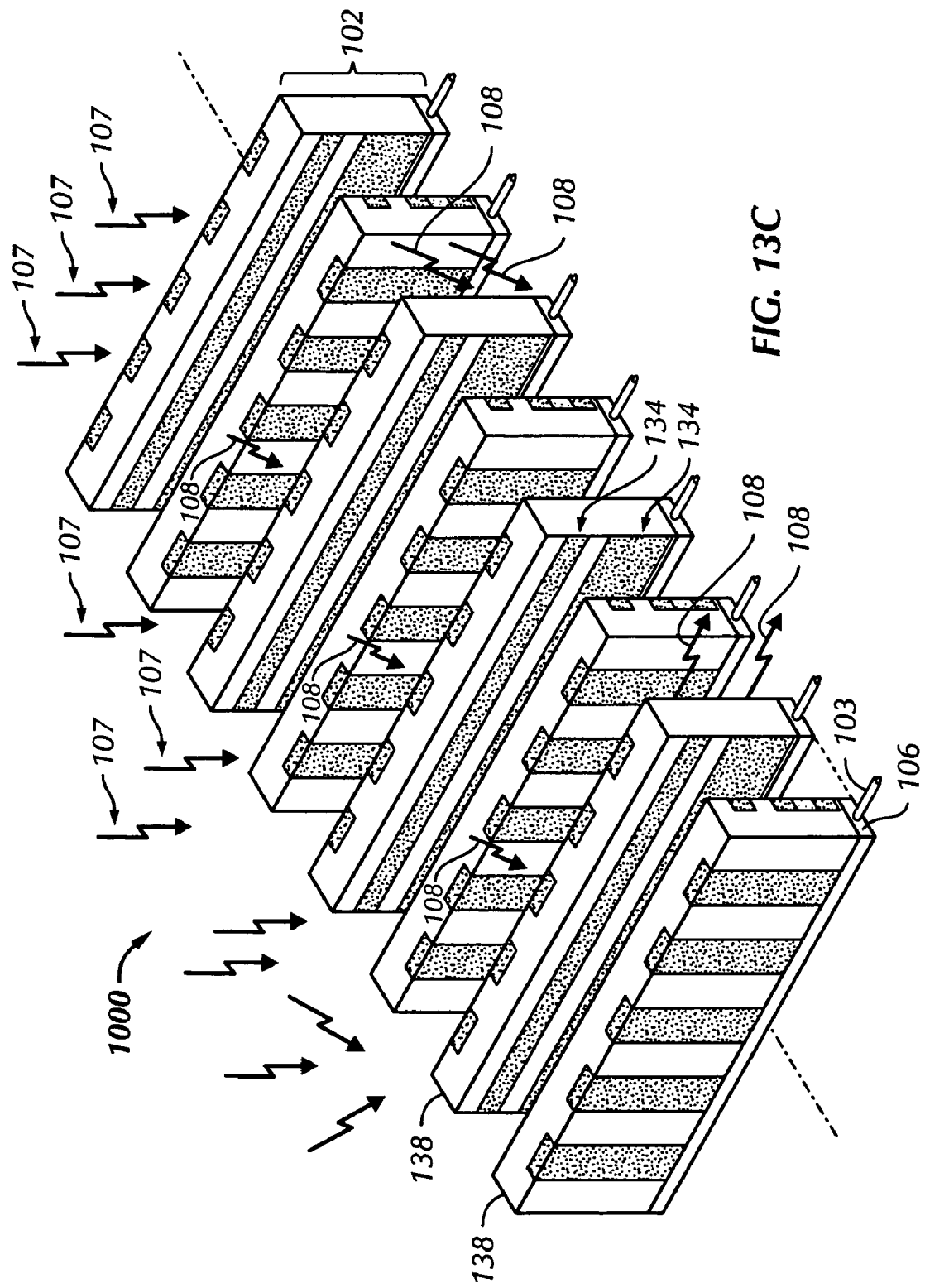
FIG. 13c illustrates a perspective view of an array of limited, basic, 2-D edge-on semiconductor detector with anode strips and crossed cathode strips with a variable cathode strip pitch near the entrance surface.

FIG. 13c illustrates a perspective view of an array 1000 of limited, basic, 2-D edge-on semiconductor detector 138 with anode readout strips and crossed cathode readout strips 134 with a variable cathode strip pitch near the entrance surface. This limited "crossed strip" design can be used to emulate the DOI capability of the design in FIG. 13b. This limited segmented cathode designs provides limited DOI capability. In one aspect, when DOI information is combined with energy resolution capability it permits rejection of high energy events that lose only a fraction of their energy and thus appear to be acceptable low energy events. The technique of implementing a variable readout element pitch in order to limit the total number of readout elements can be employed with not only strip detector but also pixellated and 3D detectors.

In one aspect, pixellated and 3D detectors are used, and they offer additional flexibility since a variable readout element pitch could be implemented within specific rows and columns. For example, a fine row and column pixel pitch could be implemented close to the detector entrance surface while a coarse row and column pixel pitch could be implemented further from the detector entrance surface. Another aspect of the invention implements a fine column pixel pitch near the detector center and a coarse column pixel pitch near the detector periphery while maintaining a fixed row pixel pitch. A 2-D implementation of this design can be assembled using an array of 1-D strip detectors as shown in FIG. 12a but with a variable strip pitch between the detector center and the end along the horizontal direction.

In one aspect, manipulation of columns of detector elements, such as pixels or vertical strips, is done to introduce additional flexibility. In one aspect, specific detector elements such as vertical strips or columns of pixels can be ignored, either by not reading them or by reading them and not including their data during image reconstruction. The ignored detector elements such as strips or columns of pixels are essentially inactive for purposes of data processing. In one aspect, selective patterns of ignored vertical strips or columns of pixels are arranged to act as buffers between sets of active vertical strips or columns of pixels, providing internal collimation. In this case the edge-on probe detector implements an "electronic" internal collimator using the detector material itself. If all vertical strips or columns of pixels are readout then it is straightforward to define multiple electronic internal collimator configurations and observe the effects of each specific configuration on the reconstructed image.

Electronic internal collimator designs used in this invention are not limited to combinations of detector elements such as vertical columns of pixels. In one aspect, complex 2-D and 3-D electronic internal collimators are used. It is straightforward to define complex 2-D and 3-D electronic internal collimators by selectively ignoring individual detector elements such as pixels to mimic conventional, mechanical converging, diverging, or parallel collimators as well as configurations that are impractical to implement with mechanical designs. The principle of creating an electronic internal collimator can be applied to both face-on detectors and edge-on detectors.

Enhanced (SAR) Edge-On Imaging Probe Detector Geometries

In one aspect, the use of SAR edge-on semiconductor and scintillator detectors in 2-D and 3-D imaging probes provides several benefits, including a reduction in the number of edge-on detector planes, the potential for higher spatial resolution across the aperture, the ability to correct for signal losses as a function of position, and an increased active detector volume. For example, with appropriate cooling a single 1-D or 2-D SAR edge-on Ge detector plane that is approximately 20 mm thick can be used to provide a 2-D or 3-D imaging probe (including a 3-D, Compton imaging probe) with a 20 mm×20 mm detector surface. The same imaging probe detector surface area can be provided by assembling multiple 1-D or 2-D SAR edge-on Ge detector planes with smaller aperture heights.

In one aspect, the use of detector planes with smaller aperture heights expands the list of viable candidate detector materials to include Si(Li), CdZnTe, CdTe, HgI$_2$, etc. Improved SAR readout rates can be attained with 1-D edge-on semiconductor detectors when the monolithic cathode plane is divided into cathode readout strips that are parallel to the anode readout strips. An additional improvement in readout rates can be attained (at the cost of increased complexity) by limited segmenting of the parallel cathode and anode strips in the manner shown in FIG. 13b. This modified, 2-D SAR edge-on detector is a limited, 3-D SAR edge-on detector. A further advantage to the limited segmentation of anode and cathode strips is that the SAR capability can be used for one segment level or both segment levels.

Figure 14:
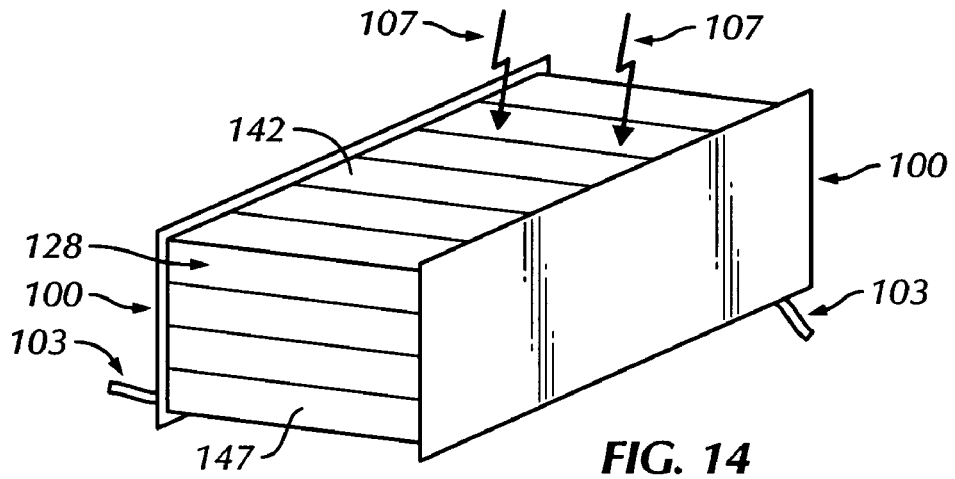
FIG. 14 illustrates a perspective view of an enhanced (SAR), 3-D edge-on imaging probe detector comprised of a SAR edge-on scintillator rod array in which the first layer of scintillator rods can be thin (a variable rod pitch along the vertical direction near the entrance surface) and of a material such as a plastic scintillator or low Z scintillator crystal in order to image charge particles or low energy gamma rays.

In one aspect, in a similar manner, a SAR edge-on scintillator rod or block design is used to provide the same imaging probe detector surface area. SAR edge-on scintillator detectors can be implemented as limited, 3-D SAR edge-on detectors in a straightforward manner. SAR edge-on semiconductor and scintillator detectors can utilize a variable semiconductor strip (or pixel) pitch or scintillator rod (or block) pitch, respectively. FIG. 14 illustrates a perspective view of an enhanced (SAR), 3-D edge-on imaging probe detector comprised of a SAR edge-on scintillator rod array 142 detector in which the first layer of scintillator rods 128 can be a thin (a variable rod pitch along the vertical direction near the entrance surface) and of a material such as a plastic scintillator or low Z scintillator crystal in order to image charge particles or low energy gamma rays. The deeper layers of scintillator rods are used to image high energy gamma rays. Data from the two photodetector arrays 100 is transmitted 103 to a computer for processing and display.

In one aspect, a number of scintillator rod implementations are used, as well as two prominent scintillator block designs (3-D blocks and arrays of sheet blocks). Positive and negative factors to consider when employing block designs rather than rod designs include the lower cost and increased active scintillator volume of blocks versus the increased dead time and response uniformity problems near the periphery associated with scintillator blocks. Despite the increased costs associated with 2-D scintillator sheet block arrays they may offer improved spatial resolution and readout rates compared to 3-D scintillator blocks as explained in Nelson, U.S. Pat. Appl. No. 60/667,824. Multiple 3-D, SAR edge-on scintillator blocks or sheet blocks (possibly using different dimensions and/or different materials) can be stacked (layered). SAR edge-on scintillator rod and block geometries can exploit a layered design that employs multiple scintillator materials. Furthermore, scintillator rod materials can be varied within a layer to optimize the response to a particular type of radiation or radiation energy. For example, the central region might detect photons or particles with specific properties while the outer region would be used to detect different particles or particle energies. There is no limitation with respect to incorporating both SAR edge-on scintillator rod and block detector designs or SAR edge-on semiconductor and scintillator detector designs in an imaging probe.

Mixed Edge-On Imaging Probe Detector Geometries

Figure 15:
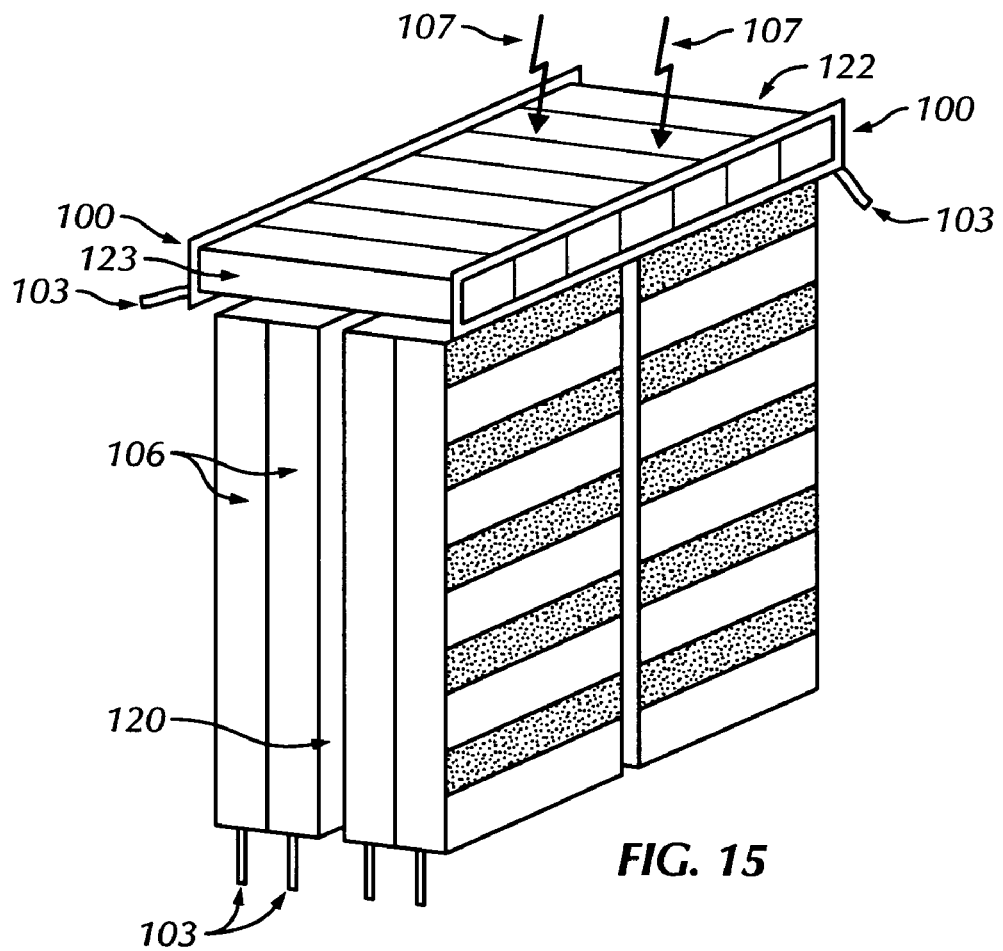
FIG. 15 illustrates a perspective view of a mixed edge-on imaging probe detector comprised of a single layer SAR scintillator rod array of a plastic scintillator or low Z scintillator crystal material for imaging charge particles or low energy gamma rays stacked on top of an array of basic, 1-D edge-on semiconductor detectors assembled as a 4-quadrant edge-on detector with an internal collimator.

In one aspect, the invention provides a mixed edge-on imaging probe detector comprised of a single layer, SAR scintillator rod array. FIG. 15 illustrates a perspective view of an exemplary mixed edge-on imaging probe detector comprising a single layer, SAR scintillator rod array 122 (using plastic scintillator or low Z scintillator crystal rods 123 and two photodetector arrays 100) for imaging charge particles or low energy gamma rays. This exemplary SAR detector is stacked on top of an array of basic, 1-D edge-on semiconductor detectors 101 (or scintillator detectors). Specific arrangements include (for example) a 4-quadrant edge-on detector with an internal collimator 120 or a 2-D edge-on detector in an edge-on imaging probe (see FIG. 12a, 1b).

Hybrid Edge-On Imaging Probe Detector Geometries

In one aspect, the invention provides SAR edge-on detector geometries or basic edge-on detector geometries that are combined with face-on detector geometries to create a hybrid edge-on imaging probe detector. For example, a Compton edge-on imaging probe based on a hybrid SAR edge-on imaging probe detector would use a face-on, planar 2-D Si or Ge array as the Compton scatterer followed by a SAR edge-on scintillator or semiconductor detector. In a different application the face-on, planar 2-D Si or Ge array might be used to detect particles such as electron or positrons (or a low energy photon) while the basic or SAR edge-on scintillator detectors might be used to detect high energy photons or other particles (possible in coincidence).

Figure 16:
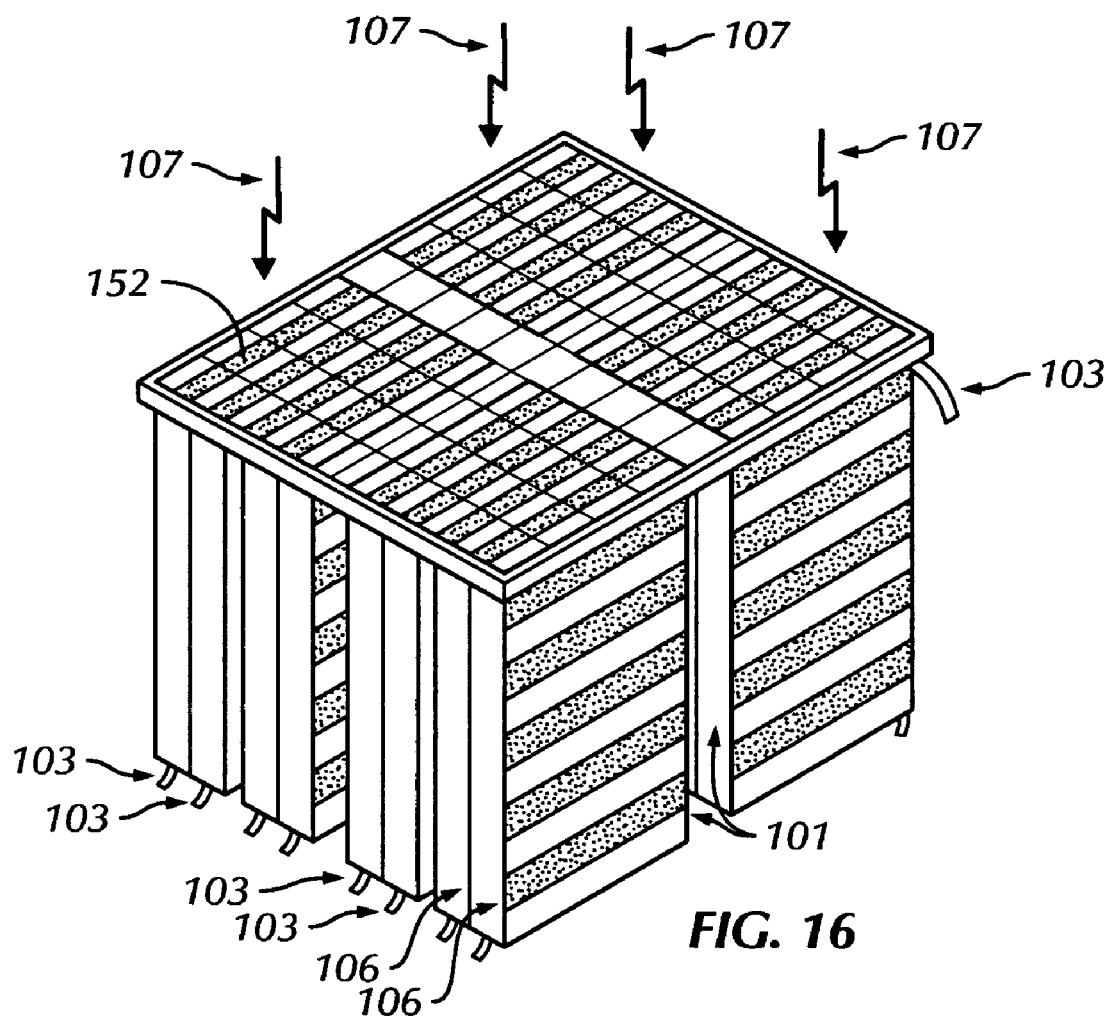
FIG. 16 illustrates a perspective view of a hybrid imaging probe detector comprised of a relatively thin, 2-D, face-on Si array detector for charge particle that is stacked on top of a 4-quadrant edge-on semiconductor detector array with an internal collimator (collimator not shown). A variant of this design uses a face-on detector array comprised of a plastic scintillator or low Z phosphor material coupled to a thinned photodetector array.

FIG. 16 illustrates a perspective view of an exemplary hybrid edge-on imaging probe detector comprised of a relatively thin, 2-D, face-on Si array 152 detector for charge particle stacked on top of an array of basic, 1-D edge-on semiconductor detectors 101 (or scintillator detectors) arranged as (for example) a 4-quadrant edge-on detector with an internal collimator 120 (collimator not shown) in an edge-on imaging probe (see FIG. 12b). An alternative configuration replaces the 4-quadrant edge-on detector with a 2-D edge-on detector array (see FIG. 12a). A variant of this design uses a face-on detector comprised of a plastic scintillator or low Z phosphor material coupled to a thinned photodiode array.

The imaging properties of edge-on (and face-on) detectors can be improved by determining their spatial- and energy-dependent response to incident radiation. The calibration techniques developed for conventional face-on imaging probes, gamma cameras, and PET cameras can be used with the edge-on imaging probe detectors describe herein. SAR edge-on detectors require additional calibration in order to determine the signal strength versus photon interaction location within a semiconductor or scintillator detector element (see Nelson, U.S. Pat. Appl. No. 60/667,824). Examples of applicable face-on DOI calibration techniques can be found in, e.g., in Huber J., et al., IEEE Trans. Nucl. Sci. Vol. 45, No. 3, pp. 1268-1272, June 1998 and Vaquero J., et al., IEEE Trans. Med. Imag. Vol. 17, No. 6, pp. 967-978, December 1998. In addition, tracking algorithm techniques developed for particle detectors and medical imaging can be used to estimate the validity of detected events and reduce signal noise.

Radiation converters or absorber materials can be integrated into an edge-on imaging probe detector. For example, a thin layer of absorber material with appropriate k-edge properties might be used to attenuate low energy photon radiation that is transmitted or scattered by a thin, face-on 2-D Si detector or scintillator detector. In a similar manner an absorber material can be used to attenuate scattered incident electrons or secondary particles. A converter material might be used to create secondary particles for an incident neutron or high energy photon. The use of non-detector materials (attenuators, converters, polarizers, etc.) to enhance the properties of an imaging detector is described, e.g., in Nelson, U.S. Pat. Appl. No. 60/667,824.

Although the embodiments of the present invention have been described in terms of its use for nuclear medicine imaging probes (primarily photons and electrons or positrons), the present invention may also be used in nuclear medicine gamma camera, PET camera, and Compton camera edge-on detector modules as well as in any industrial and scientific application, military and hazardous radiation material detection applications such as mine detection (described, e.g., in Nelson, U.S. Pat. No. 6,216,540), accelerator monitoring, and reactor monitoring. Thus, variations of the edge-on probe design can be made suitable for imaging photon with energies above 511 keV, charged particles, and neutral particles such as neutrons. For example, a basic, enhanced, mixed, or hybrid 3-D edge-on detector configuration can be incorporated into a mine detection probe or a soil contamination probe.

Consider the exemplary enhanced, 3-D edge-on probe detector of FIG. 14. As a mine detection probe penetrates the soil the enhanced, 3-D edge-on probe detector 142 can take measurements of radiation 107 entering through a window with a moveable radiation shield in the tip of the probe (incident upon its front face) or a window with a moveable radiation shield at the side of the probe (incident upon its side face 147). Rotation of the entire probe or the 3-D edge-on probe detector (with a continuous side window) permits a 360 degree field of view at a given depth along the z-axis.

LITERATURE REFERENCES EXPRESSLY INCORPORATED BY REFERENCE

Nelson, et al., High Efficiency X-Radiation Converters, U.S. Pat. No. 4,560,882 Dec. 24, 1985].

Nelson R, X-ray Detector for Radiographic Imaging, U.S. Pat. No. 4,937,453 [Jun. 26, 1990].

Nelson R, Method for Manufacturing a High Resolution Structured X-ray Detector, U.S. Pat. No. 5,258,145 [Nov. 2, 1993].

Nelson R, Nelson W, Device and System for Improved Imaging in Nuclear Medicine and Mammography, U.S. Pat. No. 6,583,420 [Jun. 24, 2003].

Nelson R, Zach R, High Resolution Device and Method for Imaging Objects Within an Obscuring Medium, U.S. Pat. No. 6,216,540 [Apr. 7, 2001].

Nelson, et al., Device and system for enhanced SPECT, PET, and Compton scatter imaging in nuclear medicine, U.S. Pat. App. Publication No. 20040251419. Filing Date: Aug. 25, 2003.

Nelson R, Modular Edge-on DOI Scintillator Detectors for SPECT, PET, and Compton Imaging, U.S. Patent Office Disclosure Document No. 567471, Dec. 28, 2004.

Braem A., et al., Nuc. Instr. Meth. Phys. Res. A Vol. 525, pp. 268-274, 2004.

Burr K., et al., IEEE Trans. Nucl. Sci. Vol. 51, No. 4, pp. 1791-1798, August 2004.

Huber J., et al., IEEE Trans. Nucl. Sci. Vol. 45, No. 3, pp. 1268-1272, June 1998.

Levin C., et al., Nuc. Instr. Meth. Phys. Res. A 527 (2004a) 35-40.

Levin C., et al., IEEE Trans. Nucl. Sci. Vol. 51, No. 3, pp. 805-810, June 2004b.

Mullani N., et al., IEEE Trans. Nucl. Sci. Vol. 25, No. 1, pp. 180-183, February 1978.

Rothfuss H., et al., IEEE Trans. Nucl. Sci. Vol. 51, No. 3, pp. 770-774, June 2004.

Shah K., et al., IEEE Trans. Nucl. Sci. Vol. 49, No. 4, pp. 1687-1691, August 2002.

Shao Y., et al., IEEE Trans. Nucl. Sci. Vol. 49, No. 3, pp. 649-654, June 2002.

Shimizu K., et al., IEEE Trans. Nucl. Sci. Vol. 35, No. 1, pp. 717-720, February 1988.

Vaquero J., et al., IEEE Trans. Med. Imag. Vol. 17, No. 6, pp. 967-978, December 1998.

Vaska P, et al., IEEE Trans. Nucl. Sci. Vol. 51, No. 5 3, pp. 2718-2722, October 2004.

D'Errico et al, Nuc. Instr. Meth. Phys. Res. A Vol. 497, pp. 105-109, 2003.

Dusi w, et al., Nuc. Instr. Meth. Phys. Res. A Vol. 448, No. 3, pp. 531-536, 2000.

Dusi w, et al., Nuc. Instr. Meth. Phys. Res. A Vol. 455, No. 2, pp. 470-475, 2000.

Hickernell T., et al., J. Nucl. Med. Vol. 29, No. 6, pp. 1101-1106, June 1988.

Huber J., et al., IEEE Trans. Nucl. Sci. Vol. 45, No. 3, pp. 1268-1272, June 1998.

Levin C., et al., Nuc. Instr. Meth. Phys. Res. A Vol. 527, pp. 35-40, 2004.

Levin C., et al., IEEE Trans. Nucl. Sci. Vol. 51, No. 3, pp. 805-810, June 2004.

Liang Z, Jaszczak R, IEEE Trans. Nucl. Sci. Vol. 37, No. 3, pp. 1282-1292, June 1990.

Liu, et al., IEEE Nuclear Science Symp. Conference Record Val, pp. 53-5'7, October 2001.

Mathy F, et al., IEEE Trans. Nucl. Sci. Vol. 51, No. 5, pp. 2419-2426, October 2004.

Morse J, et al., Nuc. Instr. Meth. Phys. Res. A 524, pp. 236-234, 2004.

Patt B, et al., IEEE Trans. Nucl. Sci. Vol. 44, No. 3, pp. 1242-1248, June 1997.

Raylman R, Wahl R, IEEE Trans. Nucl. Sci. Vol. 45, No. 3, pp. 1730-1736, June 1998.

Raylman R, J. Nucl. Med. Vol. 42, No. 2, pp. 352-360, February 2001.

Ricard M, Nuc. Instr. Meth. Phys. Res. A Vol. 458, pp. 26-33, 2001.

Saffer J, et al., Image and Vision Computing Vol. 10, No. 6, pp. 333-341, July/August 1992.

Shah K., et al., IEEE Trans. Nucl. Sci. Vol. 49, No. 4, pp. 1687-1691, August 2002.

Tornai M, et al., Med. Phys. Vol. 29, No. 11, pp. 2529-2540, November 2002.

Vaquero J., et al., IEEE Trans. Med. Imag. Vol. 17, No. 6, pp. 967-978, December 1998.

Vaska P, et al., IEEE Trans. Nucl. Sci. Vol. 51, No. 5, pp. 2718-2722, October 2004.

Visvikis, et al., IEEE Trans. Nucl. Sci. Vol. 46, No. 4, pp. 11172-1176, August 1999.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A modular, axial edge-on Sub-Aperture Resolution SAR scintillator ring detector.

2. The modular, axial edge-on SAR scintillator ring detector of claim 1, wherein axial-on SAR scintillator detector modules are employed.

3. The axial-on SAR scintillator detector modules of claim 2, comprising scintillator block ends having either a uniform rectangular geometry or an annular geometry cross-section.

4. The modular, axial edge-on SAR scintillator ring detector of claim 1 comprising scintillator rods assembled in a uniform rectangular geometry or a wedge geometry.

5. The modular, axial edge-on SAR scintillator ring detector of claim 1, wherein either multi-material axial-on or axial edge-on SAR scintillator detector modules are employed.

* * * * *